(12) United States Patent
Pratt et al.

(10) Patent No.: US 8,942,848 B2
(45) Date of Patent: Jan. 27, 2015

(54) HUMANOID ROBOT THAT CAN DYNAMICALLY WALK WITH LIMITED AVAILABLE FOOTHOLDS IN THE PRESENCE OF DISTURBANCES

(75) Inventors: Jerry E. Pratt, Pensacola, FL (US); Twan Koolen, Pensacola, FL (US); John Rebula, Ypsilanti, MI (US)

(73) Assignee: Florida Institute for Human and Machine Cognition, Pensaola, FL (US)

( * ) Notice: Subject to any disclaimer, the term of this patent is extended or adjusted under 35 U.S.C. 154(b) by 152 days.

(21) Appl. No.: 13/543,353

(22) Filed: Jul. 6, 2012

(65) Prior Publication Data

US 2013/0184861 A1 Jul. 18, 2013

Related U.S. Application Data

(60) Provisional application No. 61/504,921, filed on Jul. 6, 2011.

(51) Int. Cl.
*G05D 1/02* (2006.01)
*B62D 57/032* (2006.01)
*G05D 1/08* (2006.01)

(52) U.S. Cl.
CPC .............. *G05D 1/021* (2013.01); *B62D 57/032* (2013.01); *G05D 1/0891* (2013.01); *G05D 2201/0217* (2013.01)
USPC .......................................... 700/250; 700/258

(58) Field of Classification Search
CPC .......... G06N 3/008; G05D 2201/0217; G06K 9/3241
USPC ................. 700/245, 247, 249, 250, 258, 264; 318/568.12, 568.22, 580, 443; 901/1, 901/46–48
See application file for complete search history.

(56) References Cited

U.S. PATENT DOCUMENTS

| 8,195,332 | B2 * | 6/2012 | Pratt et al. ..................... 700/258 |
| 8,417,382 | B2 * | 4/2013 | Yoshiike et al. ............... 700/253 |
| 2007/0016329 | A1 * | 1/2007 | Herr et al. ..................... 700/250 |
| 2008/0133053 | A1 * | 6/2008 | Pratt et al. ..................... 700/245 |
| 2009/0132087 | A1 * | 5/2009 | Pratt et al. ..................... 700/258 |
| 2010/0161120 | A1 * | 6/2010 | Goswami et al. ............. 700/245 |

* cited by examiner

*Primary Examiner* — Jason Holloway
(74) *Attorney, Agent, or Firm* — J. Wiley Horton

(57) ABSTRACT

A control system for a bipedal humanoid robot that utilizes certain fundamental characteristics of bipedal motion to provide a robust and relatively simple balancing and walking mechanism. The system primarily utilizes the concept of "capturability," which is defined as the ability of the robot to come to a stop without falling by taking N or fewer steps. This ability is considered crucial to legged locomotion and is a useful, yet not overly restrictive criterion for stability. In the preferred embodiment, the bipedal robot is maintained in a 1-step capturable state. This means that future step-locating and driving decisions are made so that the robot may always be brought to a balanced halt with the taking of one step. Other embodiments maintain the bipedal robot in an N-step capturable state, in which the robot may always be brought to a balanced halt by taking N or fewer steps.

10 Claims, 26 Drawing Sheets

US 8,942,848 B2

HUMANOID ROBOT THAT CAN DYNAMICALLY WALK WITH LIMITED AVAILABLE FOOTHOLDS IN THE PRESENCE OF DISTURBANCES

CROSS-REFERENCES TO RELATED APPLICATIONS

This application is a non-provisional application claiming the benefit of an earlier filed provisional application pursuant to 37 C.F.R. §1.53(c). The provisional application was filed on Jul. 6, 2011 and was assigned Ser. No. 61/504,921.

STATEMENT REGARDING FEDERALLY SPONSORED RESEARCH OR DEVELOPMENT

This invention was made with governmental support under contract no. FA8650-05-C- 7265 awarded by the U.S. Air Force (USAF/AFMC) with the Department of Defense's Office of Naval Research and Defense Advanced Research Projects Agency (DARPA) as the funding agency. The government has certain rights in the invention pursuant to the contract listed.

MICROFICHE APPENDIX

Not Applicable

BACKGROUND OF THE INVENTION

1. Field of the Invention

The present invention pertains to a dynamically walking humanoid robot. More specifically, the present invention is directed to method for controlling a humanoid robot in a walking state, a standing state, and during transitions between states.

2. Description of the Related Art

Humanoid Robots have many potential applications in many different fields. They have the potential to do tasks that are dull, dangerous, or dirty for humans. They also have started to play a role in the entertainment, advertising, and hobby industries.

Various humanoid robots, and their associated control algorithms, have been developed to various degrees of proficiency. Some humanoid robots are capable of walking, running, going up stairs, and manipulating objects.

However, most humanoid robots lack a sufficient degree of balance to be useful in real world environments, particularly environments in which footholds are limited and disturbances are prevalent. The lack of balance and disturbance recovery provided by current humanoid robot platforms has greatly limited their widespread use.

Some of the current humanoid robots include the Honda Asimo robot, the Toyota partner robot, the Hubo robot, the Sarcos humanoid, and the Boston Dynamics Petman Robot. Most of these robots have not demonstrated walking that is robust to disturbances, such as pushes, nor have demonstrated walking with limited available footholds, such as over stepping stones. None of them have demonstrated walking with limited available footholds in the presence of disturbances.

FIG. 3 depicts a representative bipedal robot that is useful when considering the complexity of controlled bipedal motion. Body 32 is joined to thighs 55, 56 by a pair of powered hip joints 61, 62. Although the hip joints primarily pivot in the swing plane of the legs, they may have other degrees of freedom as well.

Thighs 55, 56 are joined to lower legs 57, 58 by a pair of powered knee joints 71, 72. Feet 54, 55 are joined to lower legs 57, 58 by a pair of powered ankle joints 57, 58. The powered ankle joints have multiple degrees of freedom, typically including roll and pitch. Each foot provides a platform from which an ankle joint can apply torque to a lower leg.

The control of a system such as shown in FIG. 3 is an extraordinarily complex problem. The prior art has generally focused on increasing the sophistication of the sensor and actuation technology used. Such systems seek to know the current state of each limb and joint—monitoring multiple degrees of freedom. The control systems then traditionally use a trajectory tracking approach of calculating and driving a desired position for each component in the multi-limbed system.

This approach is not very robust to variations (and errors) in the sensors and actuators, or when a large disturbance is introduced. It is apparent that human beings do not control motion with extremely high precision and likely do not employ a trajectory tracking approach. Human motion seems to be inherently based on a less precise, and more compliant control system. Yet, human beings are able to move successfully in a wide variety of circumstances. We are resistant to disturbing forces and able to "solve" the balance problem even when the conditions change drastically in mid-stride.

FIG. 1 illustrates standing human 22. The goal of the standing human is to maintain a balanced stance. If a mild disturbance is introduced—such as a gentle lateral shove—the person will be able to maintain a balanced stance without moving the feet. However, if a larger lateral shove is applied, the person will have to take one or more steps in order to prevent a fall.

The concept of "viability" has application to this scenario. If preventing a fall is the goal, then any state from which a fall can be prevented is a viable state. In some states the person can take a single step to regain a balanced stance. For a more severe disturbance the person will have to take two steps to regain a static and balanced stance. The first of these two steps cannot produce a balanced state but it is a "viable" state since it leads to a second step which will produce a balanced state.

The left side of FIG. 1 graphically depicts several possible capture regions 26. The region labeled "N=1" is the area in which the user can take a single step and obtain a static and balanced stance. The region labeled "N=2" is the region in which it is possible for the user to step and then obtain a balanced state in two total steps. The region labeled "N=3" is the region in which it is possible to take a step and then obtain a balanced state in three total steps.

The right side of FIG. 1 depicts the same scenario for a person in a running state. Running human 24 has a center of mass 84 which is moving in the direction indicated by the arrow. The one-step capture region lies well in front of the present position. This fact is intuitively true as all people understand that if one is running and one wishes to take a single step and then come to a balanced halt over that step, one must make that step well in front of the present position.

The present invention presents a novel approach to controlling bipedal motion in which robust control is demonstrated using a relatively small amount of input information. Several factors are combined to define a known region in which motion or balance is viable. FIG. 2 shows a very simplified depiction of this objective. In FIG. 2, a one step capture region 26 has been superimposed on areas that are available for stepping (in this case stepping stones 40). Those portions of the stepping stones lying within capture region 26 represent viable options and those lying outside do not. The invention uses some basic assumptions about the nature of bipedal motion to simplify the task of determining viable options for continued balance.

BRIEF SUMMARY OF THE INVENTION

The present invention is a control system for a bipedal humanoid robot that utilizes certain fundamental characteristics of bipedal motion to provide a robust and relatively simple balancing and walking mechanism. The system primarily utilizes the concept of "capturability," which is defined as the ability of the robot to come to a stop without falling by taking N or fewer steps. This ability is considered crucial to legged locomotion and is a useful, yet not overly restrictive criterion for stability. In the preferred embodiment, the bipedal robot is maintained in a 1-step capturable state. This means that future step-locating and driving decisions are made so that the robot may always be brought to a balanced halt with the taking of one step. Other embodiments maintain the robot in a 2-step, 3-step, or more generally an N-step capturable state, in which the robot can be brought to a balanced halt in N or fewer steps.

The concept of capturability is used to determine an instantaneous capture point. The instantaneous capture point is then used to determine a capture region into which the robot can step while maintaining capturability. Other constraints are added to the capture region, such as information regarding which portions of the available region will provide suitable footing for the robot.

Figure 1:
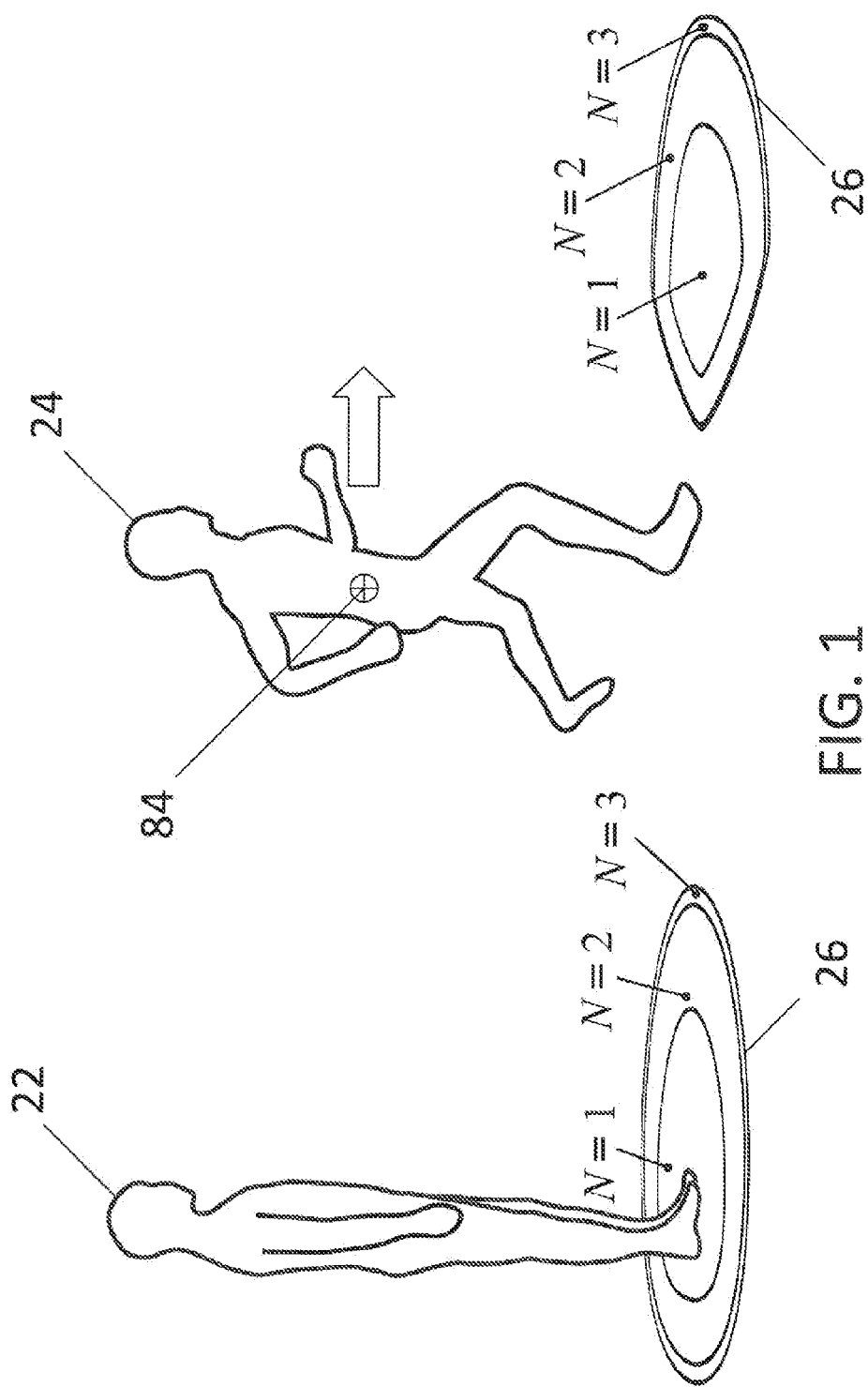
FIG. 1 is an elevation view of a running human, showing the concept of capture regions for step placement.
Figure 2:
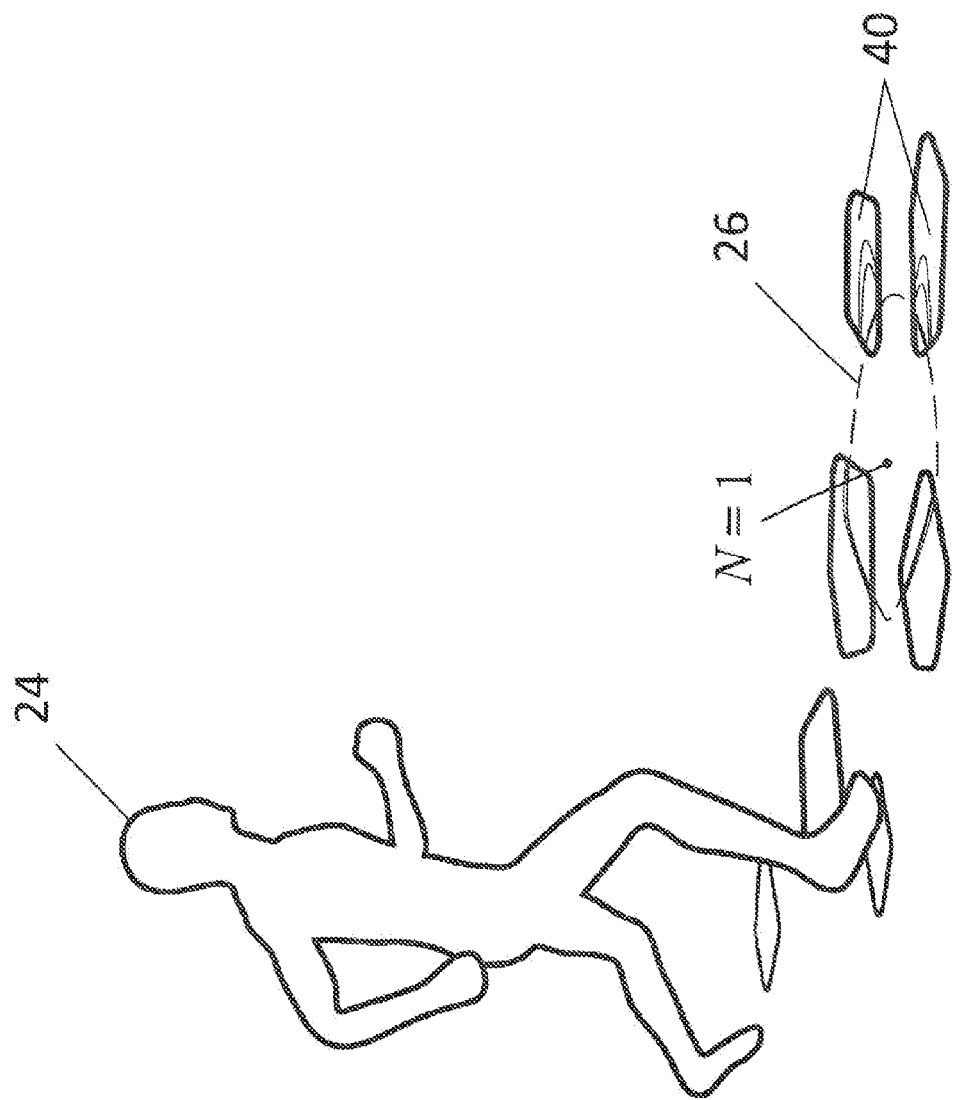
FIG. 2 is an elevation view, showing the superimposition of a capture region on an array of stepping stones.
Figure 3:
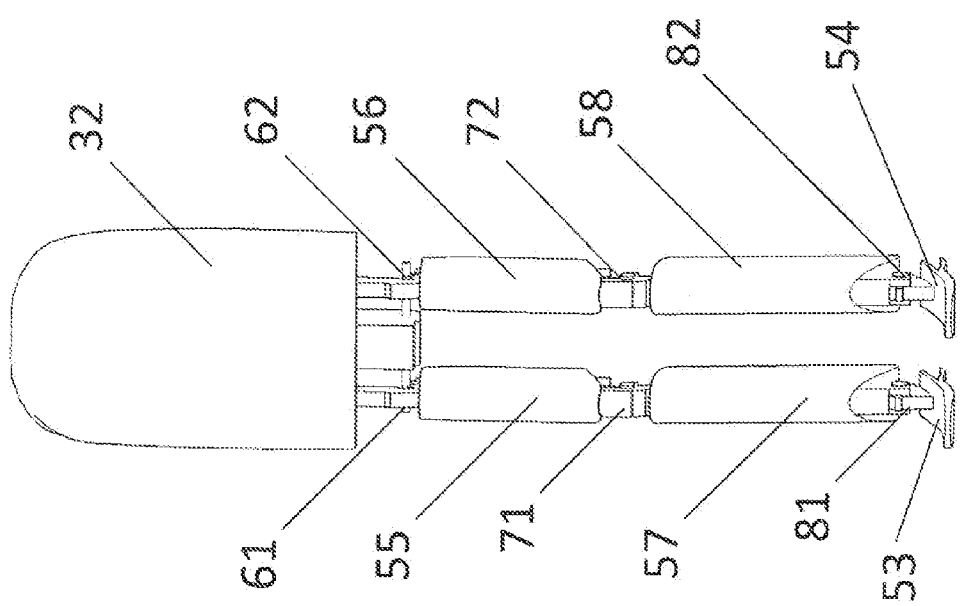
FIG. 3 is a perspective view, showing a prior art bipedal robot.

| REFERENCE NUMERALS IN THE DRAWINGS | |
|---|---|
| 20 humanoid robot | 22 standing human |
| 24 running human | 26 capture region |
| 28 disturbance | 30 stream |
| 32 body | 40 stepping stone |
| 51 leg | 52 leg |
| 53 right foot | 54 left foot |
| 55 thigh | 56 thigh |
| 57 lower leg | 58 lower leg |
| 61 powered hip joint | 62 powered hip joint |
| 71 powered knee joint | 72 powered knee joint |
| 81 powered ankle joint | 82 powered ankle joint |
| 84 center of mass | 86 point foot |
| 88 telescoping leg | 90 surface |
| 92 instantaneous capture point | 94 velocity vector |
| 96 projected center of mass | 98 capture point trajectory |
| 100 camera system | 101 camera system |
| 102 max step boundary | 103 1-step capture region |
| 104 ankle | 105 foot |
| 106 right leg | 108 left leg |
| 110 laser range finder | 112 1-step capture region boundary |
| 114 1-step capture region | 116 desired footstep calculator |
| 118 swing sub-controller | 120 inertial measurement unit |
| 121 step information | 122 upper body wrench information |
| 124 joint torque information | 126 state information |
| 128 state generator | 130 state |
| 132 stance sub-controller | 134 support polygon |
| 136 contact reference point | 138 intersection |
| 140 embedded computer system | 200 stance leg |
| 210 swing leg | 300 capture region |
| 305 support foot region | |
| 330 unlimited foothold capture region | 332 center of mass trajectory |
| 410 visible vertex | 430 projected point of visible vertex |
| 4010 step: sense state of robot | 4020 step: determine available footholds |
| 4030 step: determine a swing leg | 4040 step: determine capture region |
| 4050 step: control swing leg to step | 5010 step: determine support foot position |

| REFERENCE NUMERALS IN THE DRAWINGS | |
| --- | --- |
| 5020 step: determine reachable region | 5030 step: determine region |
| 5040 step: compute intersections of regions | 7010 step: determine instantaneous capture point |
| 7020 step: find a set of visible vertices | 7030 step: find line of sight vertices |
| 7040 step: find projected points | 7050 step: find boundary rays |
| 7060 step: combine points and rays. | |

DETAILED DESCRIPTION OF THE INVENTION

The present invention presents a simplified and robust mechanism for controlling locomotion in a multi-legged system by incorporating certain fundamental concepts regarding the operation of such systems. The first fundamental concept is "capturability." A multi-legged system is said to be "capturable" if it is possible for the system to come to a balanced stop in one or more steps. If the number of required steps is defined as N, then "N-step capturability" is the ability of the legged system to come to a stop without falling by taking N or fewer steps. This ability is considered crucial to legged locomotion and is a useful, yet not overly restrictive criterion for stability.

Figure 4:
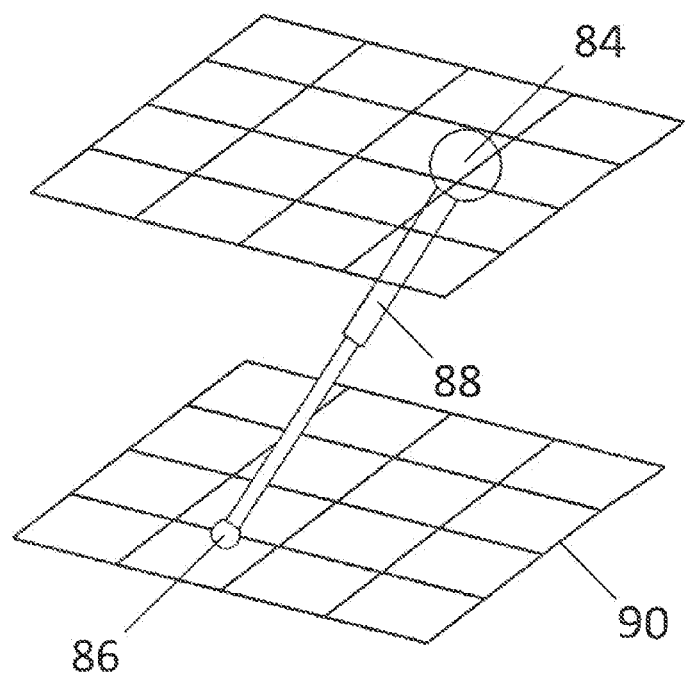
FIG. 4 is a perspective view, showing a linear inverted pendulum model with a point foot.

Some simplified dynamic models serve to illustrate the advantages of the concept of capturability. FIG. 4 shows a graphical depiction of a linear inverted pendulum. Center of mass 84 is connected to telescoping leg 88. Telescoping leg 88 ends in point foot 86. Telescoping leg 88 is used to keep Center of mass 84 at a constant height at all times. Point foot 86 may be instantaneously moved to a new location on surface 90, in any direction ("taking a step"). The mass and rotational inertia properties of the telescoping leg are zero. The goal of the device is to bring center of mass 84 to a stationary and balanced state ("capture"). If the center of mass is stationary, then the intuitive obvious solution to the capture problem is to place point foot 86 on surface 90 directly beneath center of mass 84. The result will be an inverted pendulum, with the center of mass being balanced directly over the point foot.

If the center of mass is in motion, the problem becomes more complex. FIGS. 5(A) and 5(B) illustrate this situation. In FIG. 5(A) center of mass 84 is moving in the direction indicated by the arrow. In order to bring the center of mass to a stationary and balanced condition, point foot 86 must be placed as shown (point foot 86 "leads" the center of mass). If the point foot is placed in the proper position on surface 90, then the condition shown in FIG. 5(B) will result.

Figure 5:
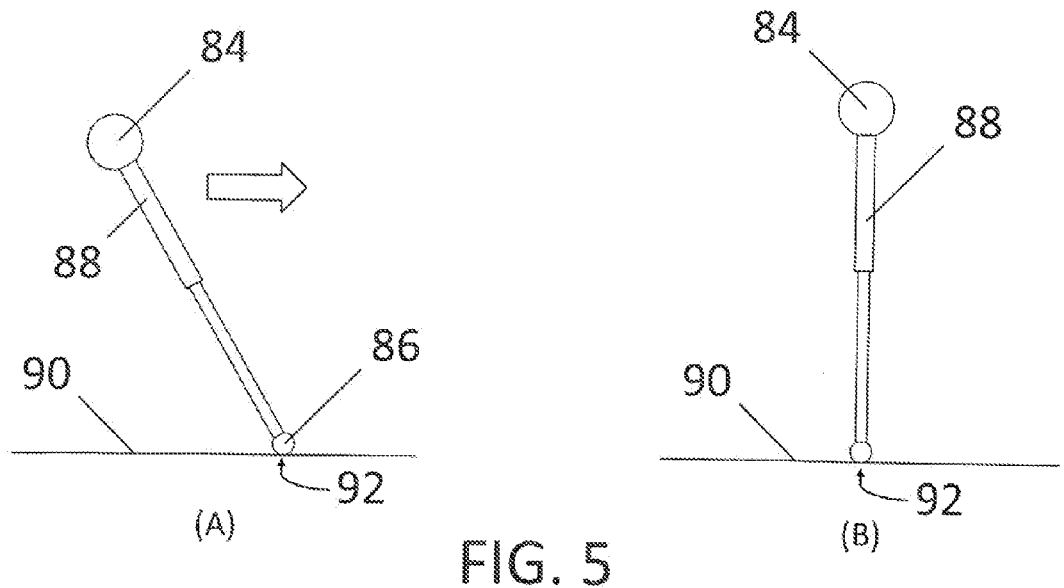
FIG. 5 is an elevation view, showing a linear inverted pendulum model.

Telescoping leg 88 has rotated to the vertical and center of mass 84 is in a captured state with no motion remaining (The reader should note that point foot 86 is assumed to have a non-slipping engagement with surface 90). FIG. 5 therefore represents a 1-step capture of the moving mass. In FIG. 5(A), the point where point foot 86 must be placed in order to achieve the 1-step capture is called the "instantaneous capture point" (instantaneous capture point 92). The instantaneous capture point is defined as $$r_{ic} = r + \sqrt{\frac{z_0}{g}} \dot{r}$$

where r is the projection of center of mass 84 onto surface 90, $z_0$ is the height of the center of mass above the surface and g is the gravitational acceleration.

The scenario of FIG. 5 is intuitively familiar to human beings. A human being in a normal walking gait has the ability to select a location for a "next step" which will allow the person to come to a complete and balanced stop. The actual dynamics of human walking are much more complex, since a human can utilize ankle torques, body lean, and other complex phenomena to achieve the desired result. However, the concept of the instantaneous capture point in the linear inverted pendulum model is still useful.

The linear inverted pendulum model shown in FIG. 5 is also useful for considering a continuous walking motion in addition to the question of capture. Returning to FIG. 5(A), the reader will observe the location of instantaneous capture point 92, which is defined as the location where point foot 86 should be placed in order to bring center of mass 84 to a balanced stop directly above the point foot.

In FIG. 5(A), point foot 86 is placed precisely in the position needed to bring the moving robotic system to a balanced halt. If, on the other hand, the point foot is not placed so far in front of the moving center of mass, then the center of mass will continue over the top of the point foot and it will not be "captured." After the center of mass passes over the point foot telescoping point foot 86 may again be placed in a new location, resulting in forward walking.

The placement of the point foot with respect to the position of the instantaneous capture point "drives" the resulting motion. This conclusion is a valuable insight. If the objective is to "capture" the moving mass with the next step, then point foot 86 should be placed on the instantaneous capture point. If the objective is to continue the present motion, then point foot 86 should be placed somewhere short of the instantaneous capture point so that the inverted pendulum pivots over the top of the point foot and keeps moving.

While FIG. 5 presents a side elevation view, the reader should not understand the linear inverted pendulum model as being a two-dimensional model. It is possible for the center of mass to move in a straight line. However, by placing point foot 86 to one side of the direction of motion, the path of the center of mass may be slewed into almost any desired trajectory. Thus, the linear inverted pendulum model presented is a three-dimensional model. It may be referred to as a three-dimensional linear inverted pendulum model, or "3D-LIP Model."

Figure 6:
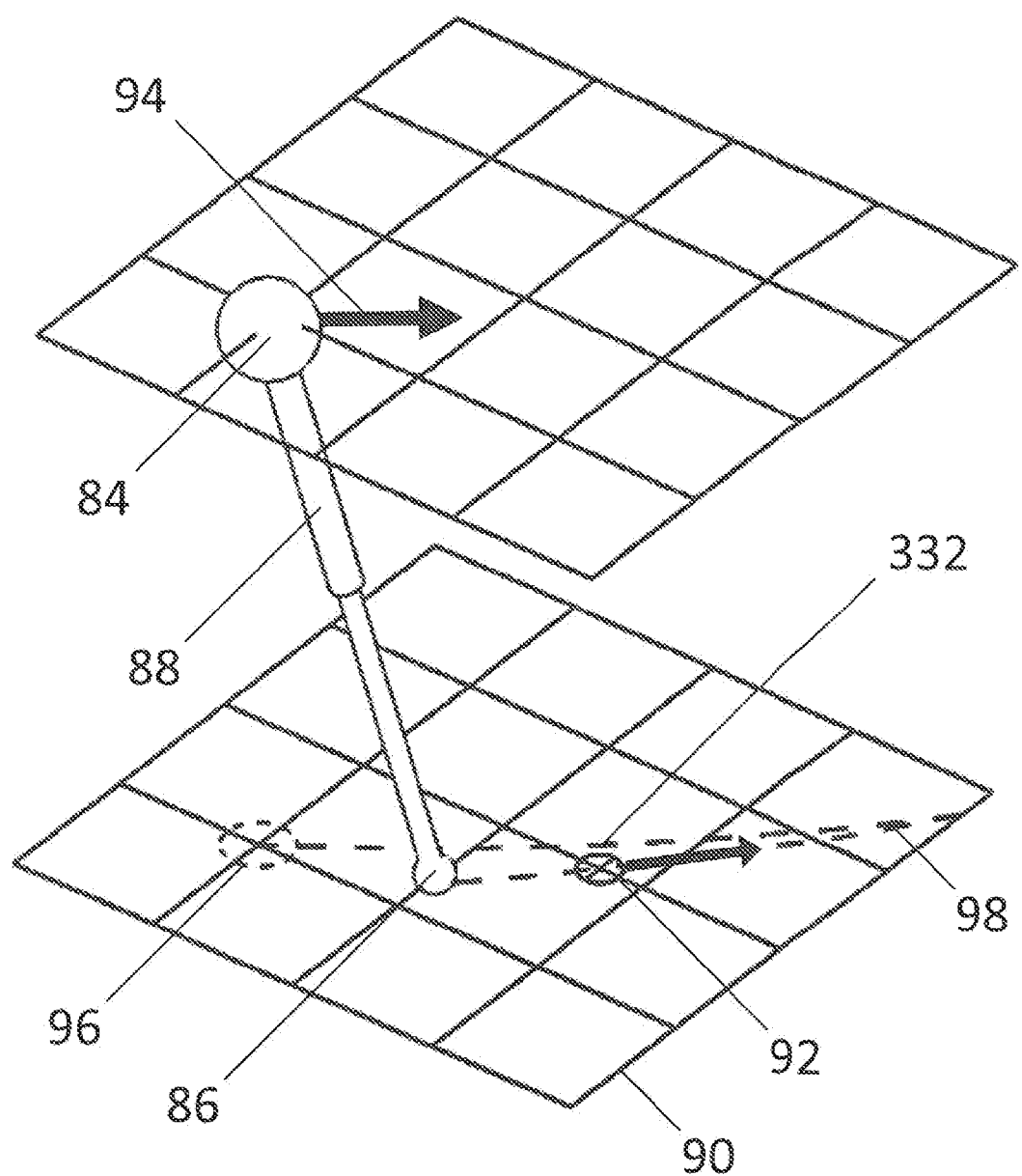
FIG. 6 is a perspective view, showing the operation of a linear inverted pendulum model in which the center of mass is in motion.

FIG. 6 is presented to graphically illustrate the motion of some of the elements of the 3D-LIPModel. In FIG. 6, center of mass 84 is moving with velocity vector 94. Telescoping leg 88 is placed on surface 90. At the instant shown, the inverted pendulum is pivoting over the top of point foot 86. Instantaneous capture point 92 exists in front of the location of center of mass 84. The center of mass is projected onto surface 90 to aid visualization (The projection is projected center of mass 96).

Instantaneous capture point 92 moves as the center of mass moves. For the 3D-LIP Model, the instantaneous capture point moves along a line that is drawn through the present location of point foot 86 and the present location of the instantaneous capture point itself (assuming that the location of point foot 86 remains fixed). Thus, the instantaneous capture point 92 moves along the dashed line designated in the view as capture point trajectory 98. With the linear inverted pendulum model, the dynamics of the instantaneous capture point will be $$\dot{r}_{ic} = \sqrt{\frac{g}{z_0}} (r_{ic} - r_{CMP})$$

where $r_{CMP}$ is the position of the Centroidal Moment Pivot. For a point foot, the Centroidal Moment Pivot reduces to the point foot position.

It is helpful to visualize the motion of the instantaneous capture point with respect to FIG. 6. The motion of the inverted pendulum is determined by (1) the fact that point foot 86 remains fixed; and (2) the fact that center of mass 84 is pivoting over the top of point foot 86 with velocity vector 94. At a given instant, one may determine the location of instantaneous capture point 92. It is intuitively obvious, however, that the instantaneous capture point will not remain fixed. If point foot 86 remains in the location shown and center of mass 84 pivots over the top of the point foot, moving the point foot to the location of the instantaneous capture point shown in the view will no longer bring the system to a balanced stop. Instead, the point foot would have to be placed further ahead in order to generate a balanced stop. The instantaneous capture point has moved. Given the Linear Inverted Pendulum Model, the instantaneous capture point moves in the direction of a line drawn between the present location of the point foot and the present location of the instantaneous capture point.

In FIG. 6, the reader will observe that projected center of mass 96 moves along a curved center of mass trajectory 332. The "stepping" of point foot 86 has been slewed somewhat to generate a curved motion for the center of mass. One may use the 3D-LIP Model to generate an endless variety of curved or straight Center of Mass paths.

The 3D-LIP model is useful for determining multiple-step capturability in addition to capturability with one step. One may visualize this phenomenon with FIG. 6 as well. If one assumes that telescoping leg 88 may be instantly extended or retracted to any desired length, then the system is always 1-step capturable. For example, if center of mass 84 is moving at a very high velocity, the instantaneous capture point might be 1,000 meters (3,280 feet) ahead of projected center of mass 96. However, under the assumption of an instantly extendable telescoping leg of infinite potential length, one may still place point foot 86 on the instantaneous capture point.

This is not a remotely realistic scenario, however. One of the first reasonable assumptions to make is that telescoping leg 88 must have a minimum and maximum allowable length. Even if one assumes that the length can be changed instantaneously, the min/max length constraints start to alter the capturability analysis. If center of mass 84 is allowed to pivot over the top of point foot 86 and accelerate forward, instantaneous capture point 92 may move beyond the ability of telescoping leg 88 to reach it in a single step. If that is true, the system is no longer capturable in 1 step. A fall is not yet inevitable, however. If the leg is stepped toward the "fleeing" instantaneous capture point it may be possible for point foot 86 to "catch up" with the instantaneous capture point in 2 steps. If it is not possible in 2 steps then it may still be possible in 3 or more steps. One may therefore perceive how allowing more steps will permit the system to be captured in a larger area. Returning briefly to FIG. 1, this phenomenon explains in part why the 3-step capture region for the running figure (N=3) is larger than the 1-step capture region.

Figure 7:
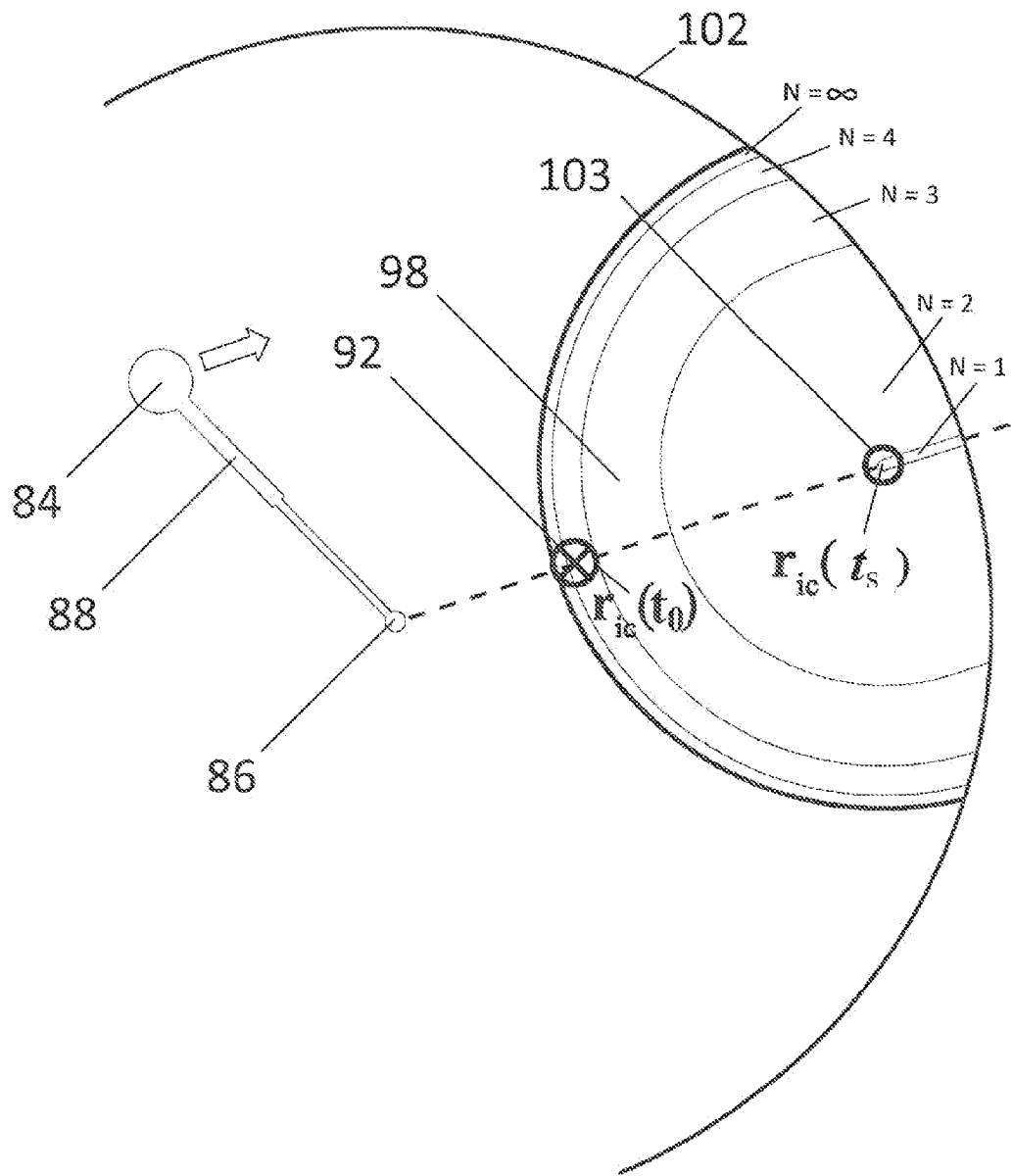
FIG. 7 is a plan view, capture regions of a linear inverted pendulum model with a maximum step boundary and minimum step time constraint.

FIG. 7 presents a perspective view of the 3D-LIP Model with the addition of some of the "real world" constraints. The originally-presented model allowed an instantaneous step in which point foot 86 was moved from one location to another with no time elapsing between steps. This is of course impossible for a real system. In FIG. 7, the 3D-LIP Model is constrained by both a maximum step boundary 102 and a minimum time required to move the point foot from one location to another ("minimum step time" ($t_s$)).

Center of Mass 84 is moving in the direction indicated by the arrow. Instantaneous capture point 92 is located as shown at that time $t_0$. However, it is no longer possible to instantaneously step to that point. Instead, one must move to an instantaneous capture point that will exist at a future time beyond the passage of the minimum step time. The closest future instantaneous capture point. is shown as $r_{ic}(t_s)$. A 1-step capture region extends forward from this point along capture point trajectory 98. This region is labeled as achievable 1-step capture region 103. It is not a single point, but rather a line segment. This is true because the instantaneous capture point moves. A step taken at the earliest possible time results in point foot 86 being placed in the closest portion of the region labeled N=1. If a delay is made in taking the step then the point foot must be placed further to the right in the view.

The achievable 2-step capture region (N=2) is significantly larger. If the 3D-LIP model is allowed to take a first step and then a second step, there exists a sequence of steps and control actions that brings it to a balanced rest, starting with a step somewhere within the region labeled "N=2." If 3 steps are allowed, it can be brought to a balanced rest by stepping somewhere within the region labeled "N=3." The reader will observe that the use of additional steps tends to produce a diminishing return. The entire capture region is the union of the N-step capture regions as N approaches infinity.

FIG. 7 also shows the constraint of a maximum step boundary. Max step boundary 102 represents the maximum single step which the model can make from the existing location of point foot 86. This boundary is drawn as a circle centered on the present location of point foot 86. However, more general boundaries that take into consideration the particular swing leg limitations of a given robot may be used. This constraint means that some of the possible point foot positions within the region labeled N=1 are not available because telescoping leg 88 simply cannot reach that far. The unavailable locations lie to the right of max step boundary 102 in the view.

Figure 8:
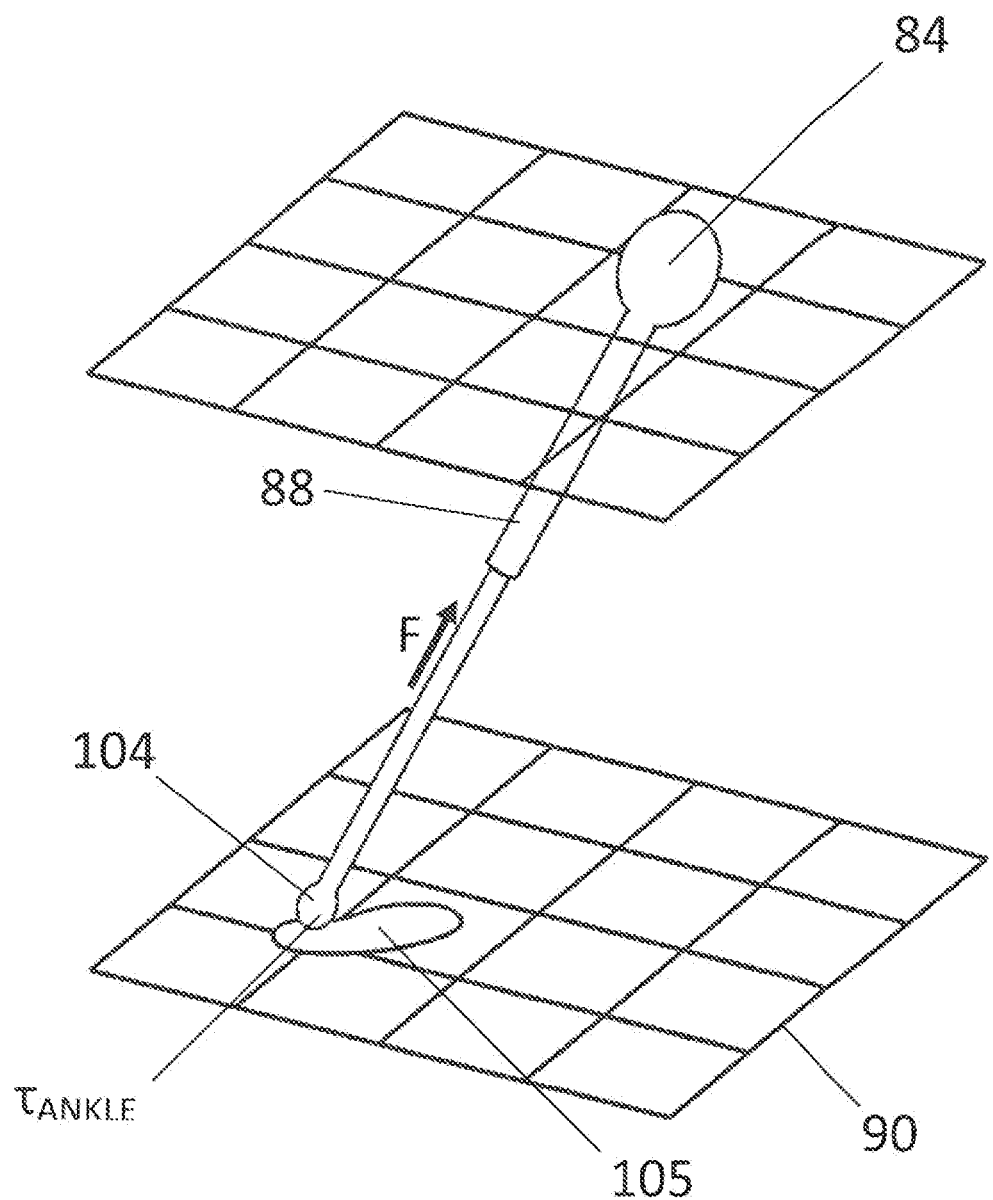
FIG. 8 is a perspective view, showing a linear inverted pendulum model with a finite-sized foot.

The preceding examples have used a point foot in combination with a linear inverted pendulum model of walking. The use of a point foot significantly constrains the motion available, since a point foot cannot apply any torque between the ground and an ankle joint. Actual bipedal motion does not resemble a point contact. Instead, it is common for ground contact to be made across a surface. FIG. 8 shows a more advanced 3D-LIP Model in which foot 105 is joined to telescoping leg 88 by ankle 104. The foot is joined to the ankle by a 2 degree of freedom joint, and is assumed to be massless. In this model, the foot is able to transmit torque to the leg through the ankle ($\tau_{ankle}$) and the leg itself is capable of generating linear force between the foot and the Center of Mass point. The torques are limited so that the foot does not start to rotate with respect to the ground. The ankle joint allows the foot to move in pitch and yaw.

The ability to apply torques from the finite-sized foot means that the location of the center of pressure (CoP) can be varied across the area of the foot. Those skilled in the art will know that the term "center of pressure" means a point at which a distributed force may be conceptualized as occurring.

Figure 9:
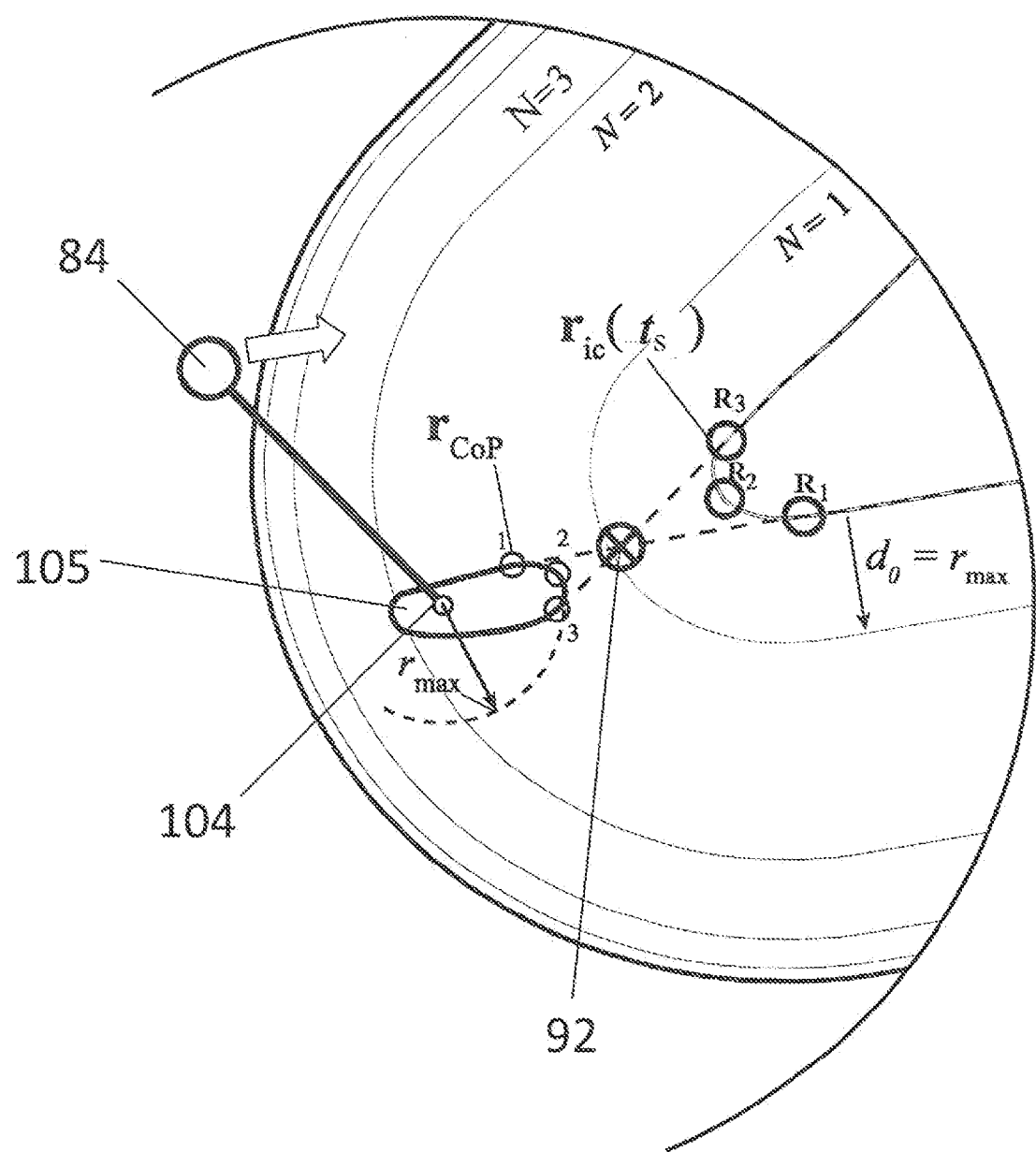
FIG. 9 is a plan view, showing capture regions of a linear inverted pendulum model with a finite-sized foot, a maximum step boundary, and a minimum step time constraint.

The fact that a control system can vary the location of the CoP across the foot is significant. This is in fact one thing that human beings do as we move. FIG. 9 shows a depiction of the 3D-LIP Model with a finite-sized foot. Center of mass 84 is moving as indicated by the arrow. The view graphically depicts some information that is useful in determining the 1-step and greater capture regions for the model with a foot.

The reader will recall from the point foot model that the instantaneous capture point moves along a line drawn between the present location of the point foot and the present location of the instantaneous capture point. In the case of the model having a finite foot, there is no "point foot." This value is replaced by a center of pressure (CoP). To find the capture regions for this model, the effect of a time-varying CoP must be investigated.

At any given instant there will be an instantaneous CoP. A CoP is a point in space where the entire distributed force across the foot can be conceptualized as being concentrated. Of course, as the center of mass moves along, the CoP will change. As the CoP changes the instantaneous capture point will also change. A time-varying CoP causes the instantaneous capture point to move from an initial position to a final position in a certain time interval. An equivalent constant CoP is a point where the CoP could have been held constant while still moving the instantaneous capture point from the initial position to the final position in the same time interval.

For the 3D-LIP Model with a finite-sized foot, the equivalent constant CoP is a weighted average of the CoP as a function of time. The time-varying CoP must always be inside the base of support, which is a convex set. By definition, a weighted average of the elements of a convex set must also be contained in the convex set. If the base of support of the 3D-LIP Model with a finite-sized foot is constant, then the equivalent constant CoP for any realizable instantaneous capture point trajectory lies within the base of support.

These principles greatly simplify the analysis of capturability and capture regions, since only CoP positions that are within the base of support need to be considered in any mathematical derivations. The instantaneous capture point and equivalent constant CoP concepts may then be used to determine capturability for the 3D-LIP Model with a finite-sized foot.

The strategy that brings the model to a balanced halt in as few steps as possible comprises (1) stepping as soon as possible in the direction of the instantaneous capture point; and (2) maintaining the CoP as close to the instantaneous capture point as possible. This occurs when the CoP is placed at the point on the edge of the base of support (the perimeter of the foot) that is closest to the instantaneous capture point. If the foot is assumed to be optimally oriented to the direction of motion, the point that is closest to the instantaneous capture point will also be furthest from the ankle. This greatest distance between the perimeter of the foot and the ankle will be denoted as $r_{max}$.

FIG. 9 shows the factors which may be used to determine the N-step capturability regions for the 3D-LIP Model with a finite-sized foot. Due to the fact that the CoP can be placed anywhere within the outline of the foot, there is now more than one location where the instantaneous capture point can be at the end of the minimum step time. The location of the possible future instantaneous capture point (following the passage of the minimum step time) will be a scaled reflection of the possible CoP locations across the initial instantaneous capture point.

FIG. 9 shows three possible CoP locations, denoted as points 1, 2, and 3 (obviously an infinite number of additional possible CoP's lie between these 3 points). Points 1, 2, and 3 are all "visible" from the location of the instantaneous capture point 92. By "visible" we mean that a line segment from the instantaneous capture point to each of the points does not pass through the interior of the foot 105. Points 1 and 3 represent the extreme of visible CoP's. Points 1 and 3 therefore represent the bounding extreme of the area into which the CoP can be reflected. The two dashed lines pass from the CoP points 1,3 through the instantaneous capture point 92, and off to the right in the view. These represent the boundaries of where the instantaneous capture point can be guided to before a step is taken. The three reflected CoP points R1, R2, R3 are reflected through the instantaneous capture point 92 to plot the locations for the possible future instantaneous capture points.

CoP point 1 provides a good example. If the CoP remains constant at point 1 between time $t_0$ and time $t_s$, then the instantaneous capture point representing the minimum step time will reside at the point labeled $r_{ic}(t_s)$ (point R1). The distance between instant capture point 92 and the reflected point depends upon the minimum required swing time. The reflected point R1 represents the fastest step that can be made.

CoP location 2 is closest to instantaneous capture point 92 and results in the closest possible location of $r_{ic}(t_s)$ (the reflected point R2). The set of all possible instantaneous capture point locations at time $\Delta t_s$ is a scaled point reflection of all the possible locations of the CoP. This set of points lies (1) to the right of the curved arc between points R1, R2, and R3; and (2) inside the two diverging dashed lines. Of course, not all the theoretical points are available. As for the example of FIG. 7, the "N=1" capture region only includes points which can actually be reached by the leg in a single step.

The ability to place the CoP anywhere inside the foot support polygon after a step expands the coverage of each of the capture regions. CoP location 2 is the farthest point on foot 105 from ankle 104. The distance between this point and the ankle is denoted as $r_{max}$. The "N=1" capture region must be expanded by the value $d_0$, which in this case is equal to $r_{max}$. Thus, the "N=1" zone is expanded by the value $r_{max}$ as shown in the view. This means that the ankle may be located anywhere in this region while still being able to rotate and place the swing foot in such a way that it can provide a CoP that achieves capture.

Figure 10:
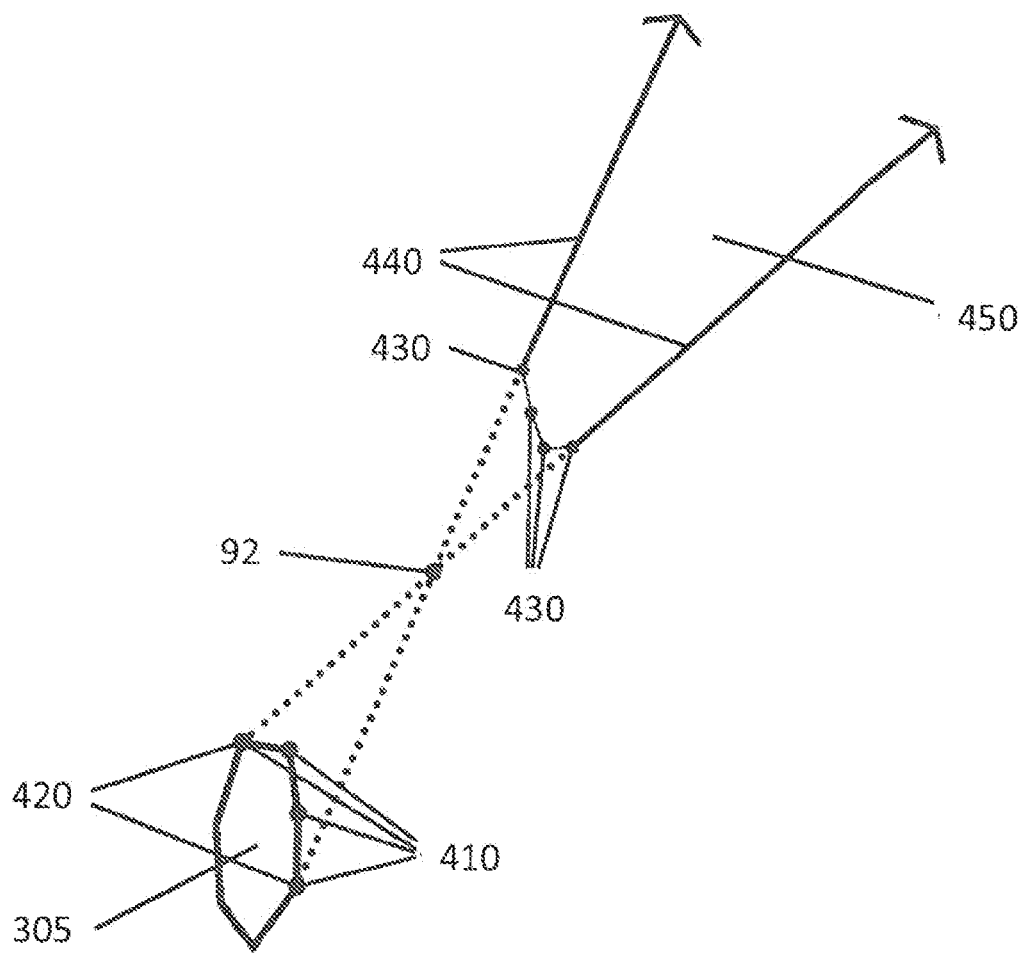
FIG. 10 is a plan view, showing the projection of possible centers of pressure through an instantaneous capture point.

FIG. 10 shows a simplified depiction of the basic principles. In this case the foot is represented as a convex polygon, support foot region 305. Instantaneous capture point 92 is determined. Next, each "visible" possible CoP on the support foot region is determined. These are the vertices from which a straight line can be drawn to instantaneous capture point 92. They are said to be "visible" from the vantage point of the instantaneous capture point (visible vertices 410).

The two outermost visible vertices are denoted as line of sight vertices 420. A straight line is projected from each line of sight vertex 420 through instantaneous capture point 92. These lines are denoted as capture region boundary rays 440. Each visible vertex 410 is also reflected through instantaneous capture point 92 to create projected point of visible vertices 430. The area bounded by capture region boundary rays 440 and the set of projected point of visible vertices 430 is the one-step unlimited foothold and reach capture region 450.

A further refinement of the 3D-LIP model with a finite-sized foot is the modeling of the "body" as more than a point mass. If the body is modeled as a rigid body having a mass moment of inertia, the dynamics of the system change. Hip torque can be applied between the top of the leg and the body. A centroidal moment pivot (CMP) replaces the CoP used in the prior model.

With the inclusion of the reaction mass, the model can be 0-step capturable even when the instantaneous capture point lies outside the base of support. The requirement for 0-step capturability is that the instantaneous capture point should be inside the base of support after the application of the torque profile. The inclusion of the reaction mass model significantly expands the capture regions in comparison to the point mass model.

In comparing the models presented, the reader will note how the increase in the number of possible stabilizing mechanisms, such as adding a foot, and adding reaction mass, leads to an increase in capture region size. This result implies that there are more viable foot placements when additional stabilizing mechanisms are added. The reader will also note how the size of the N-step capture region can be used as a measure of capturability. This is referred to as a "capturability margin." A system with a large capturability margin will be more tolerant to disturbances than a small capturability margin.

All three models produce relatively simple and comprehensible equations of motion. The three models also reveal the relationship between the location of the point foot, the CoP, and the CMP in the analysis of capturability. Despite time variant inputs, the dynamics of the instantaneous capture point remains easy to predict for all three models. The instantaneous capture point diverges away from the CMP along a straight line at a velocity proportional to the distance to the CMP. The CMP reduces to the CoP if no reaction mass is present or actuated. The CoP reduces to the point foot location if the bases of support is infinitesimally small.

All the models suggest things regarding stable locomotion. The point foot model suggests that in order to remain capturable, the foot should be placed sufficiently quickly in the direction of the instantaneous capture point. This very simple strategy is a good predictor of stable foot placement.

The finite-sized foot model with equivalent constant CoP greatly simplifies the analysis of motion. The model including reaction mass demonstrates that lunging as soon as possible in the direction of the instantaneous capture point maximizes the level of capturability. The ability to perform rapid steps is most important to the goal of remaining capturable.

Having described the general principles of capturability, this discussion will now turn to the question of how to apply the principles in creating a control system for a bipedal robot. In an actual moving robot, it is important to identify "next step" locations which lead to a capturable state. It is also important to determine whether the identified locations are actually available to the robot. As an example, if a step location leading to a capturable state (from a balanced motion standpoint) happens to lie beyond the edge of a precipice, the control system must "know" to discard that option.

Figure 11:
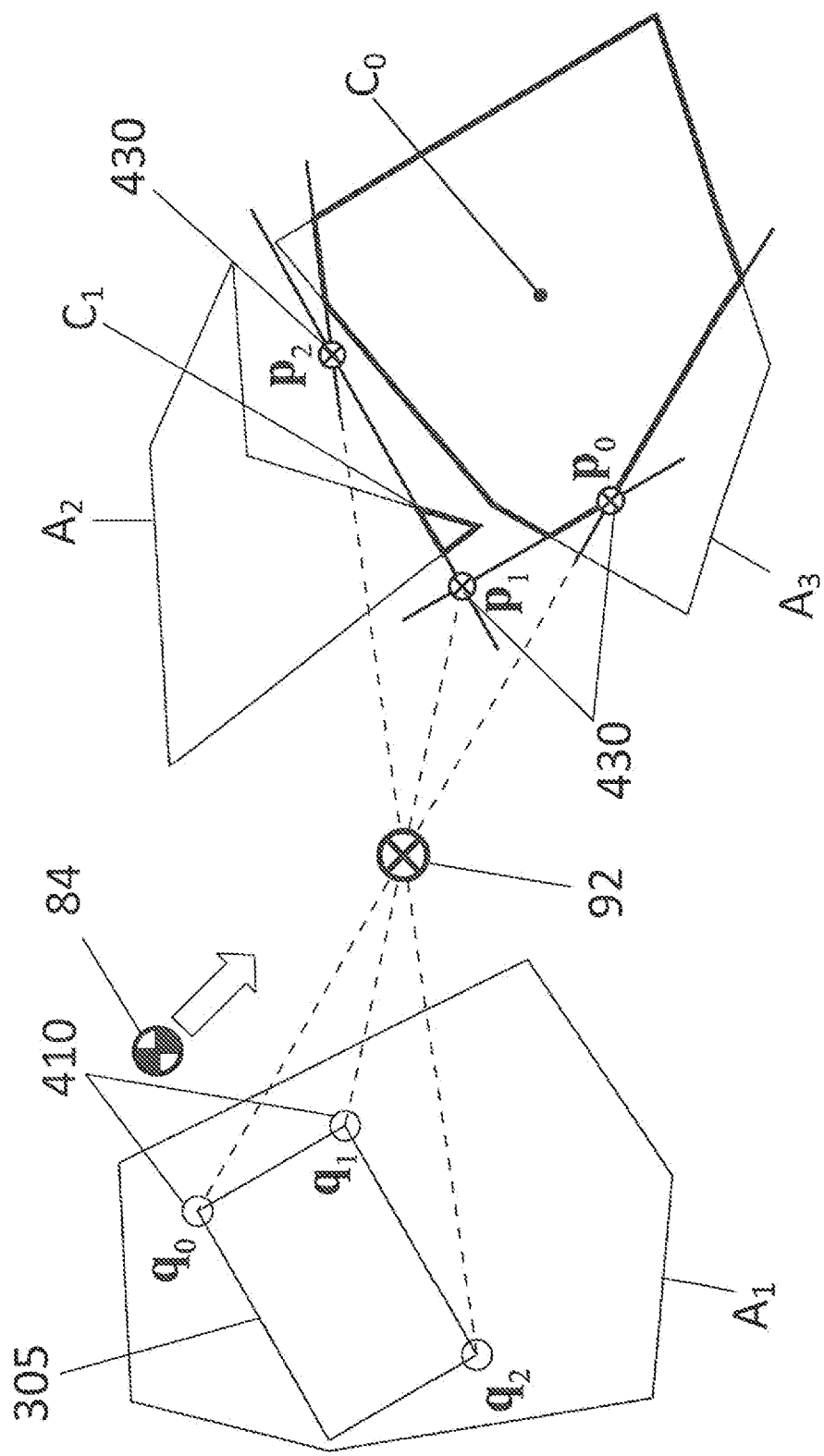
FIG. 11 is a plan view, showing the determination of a one-step capture region where the area of possible steps is limited.

FIG. 11 graphically depicts the operation of a 1-step capture region calculator. In this example, the control system "chooses" an appropriate next step location based on (1) the goal of maintaining 1-step capturability; and (2) the goal of stepping to a location providing good footing (such as a rock instead of a flowing stream). Support foot region 305 is depicted as a convex polygon, in this case a simple rectangle for clarity of presentation. It is currently placed on a suitable polygon $A_1$. This polygon may be a suitable stone surface or any other suitable surface. Other suitable polygons are $A_2$ and $A_3$. The figure refers to a bipedal robot. Support foot region 305 represents the foot that is presently on the ground. The other foot is to be swung forward and placed in a new location such that the CoP lies inside $A_1$, $A_2$ or $A_3$.

Center of mass 84 is moving-in the direction indicated by the arrow. It is possible as explained previously to compute an instantaneous capture point 92. Next, the ordered set of support polygon vertices 410 that are visible from the instantaneous capture point 92 are determined. These vertices are labeled $q_0$, $q_1$, and $q_2$. The visible vertices are then projected through instantaneous capture point 92 (using the scaling factor appropriate to the minimum swing time) to create three projected points where the instantaneous capture point 92 would lie after the minimum step time has elapsed. The projected points are labeled $p_0$, $p_1$, and $p_2$. Polygons $C_0$ and $C_1$ are constructed by finding the parts of $A_1$, $A_2$ and $A_3$ that lie between the two diverging dashed lines and to the right of the lines shown connecting $P_0$, $P_1$, and $P_2$. In order for the system to (1) remain 1-step capturable, and (2) step onto an appropriate surface, it must place its CoP somewhere in the polygons $C_0$ and $C_1$ after taking a step.

Figure 12:
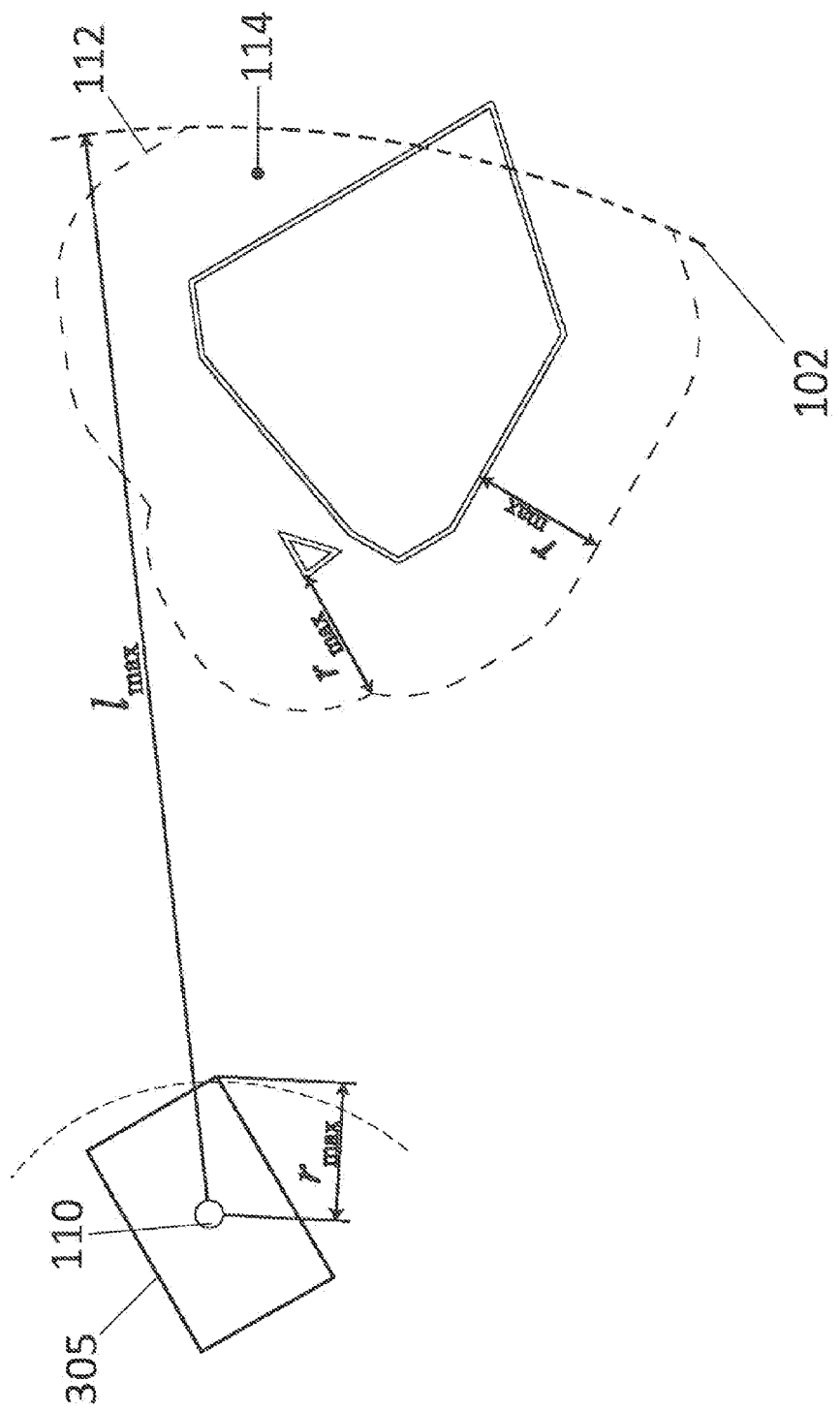
FIG. 12 is a plan view, showing the determination of a one-step capture region where the area of possible steps is limited.

The 1-step capture region is however not defined in terms of CoP locations, but in terms of step locations. FIG. 12 illustrates the conversion of the CoP regions $C_0$ and $C_1$ into the capture region 114. Support foot region 305 includes contact reference point 110. The maximum distance from the contact reference point to a point that is still within the boundary of support foot region 305 is the value $r_{max}$. Since the foot may be yawed as desired, the perimeter of the polygons $C_0$ and $C_1$ must be extended outwardly a distance equal to $r_{max}$. This results in the creation of extended 1-step capture region 112. As also explained previously, the bipedal robot cannot take a step that is outside of its maximum step boundary 102. In the preferred embodiment, we represent the maximum step boundary as a circle, with radius equal to the maximum step distance $l_{max}$. A radius of this length is drawn from contact reference point 110. Areas that are beyond this radius are not available because they cannot be reached in a single step. Intersecting step boundary 112 with the maximum step boundary 102 creates 1-step capture region 114. A step may be made anywhere in this region while maintaining 1-step capturability.

Figure 13:
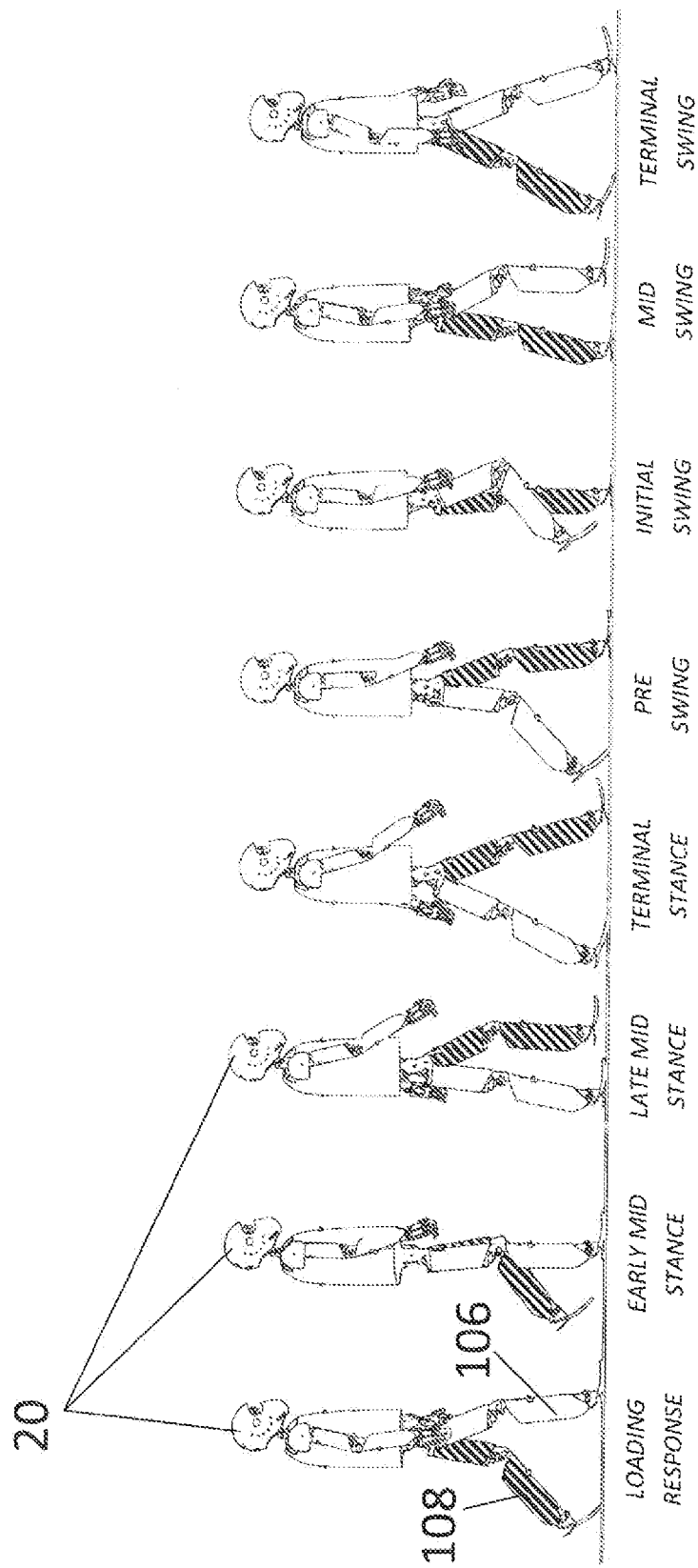
FIG. 13 is an elevation view, showing the different walking states of a bipedal robot.

The actual control of a bipedal robot involves more than taking a single step. It involves the continuous control of a series of steps using alternating legs. Bipedal motion is generally thought of as including a series of successive states. FIG. 13 illustrates our preferred representation of these states. The eight depictions of humanoid robot 20 indicate the state with respect to right leg 106. Left leg 108 is generally moving in the opposite direction and is in a different state.

Figure 14:
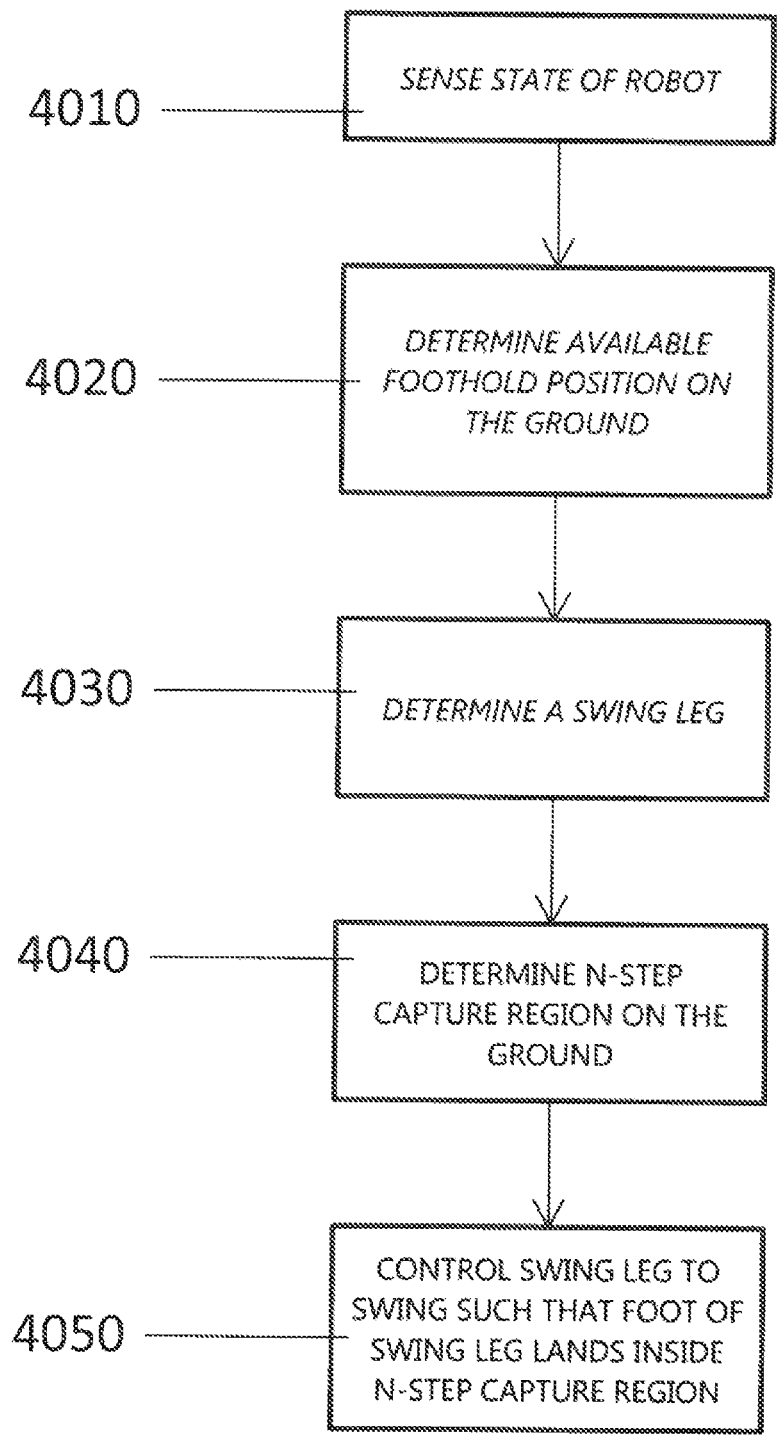
FIG. 14 is a flow chart showing the operation of the robot's control system.
Figure 15:
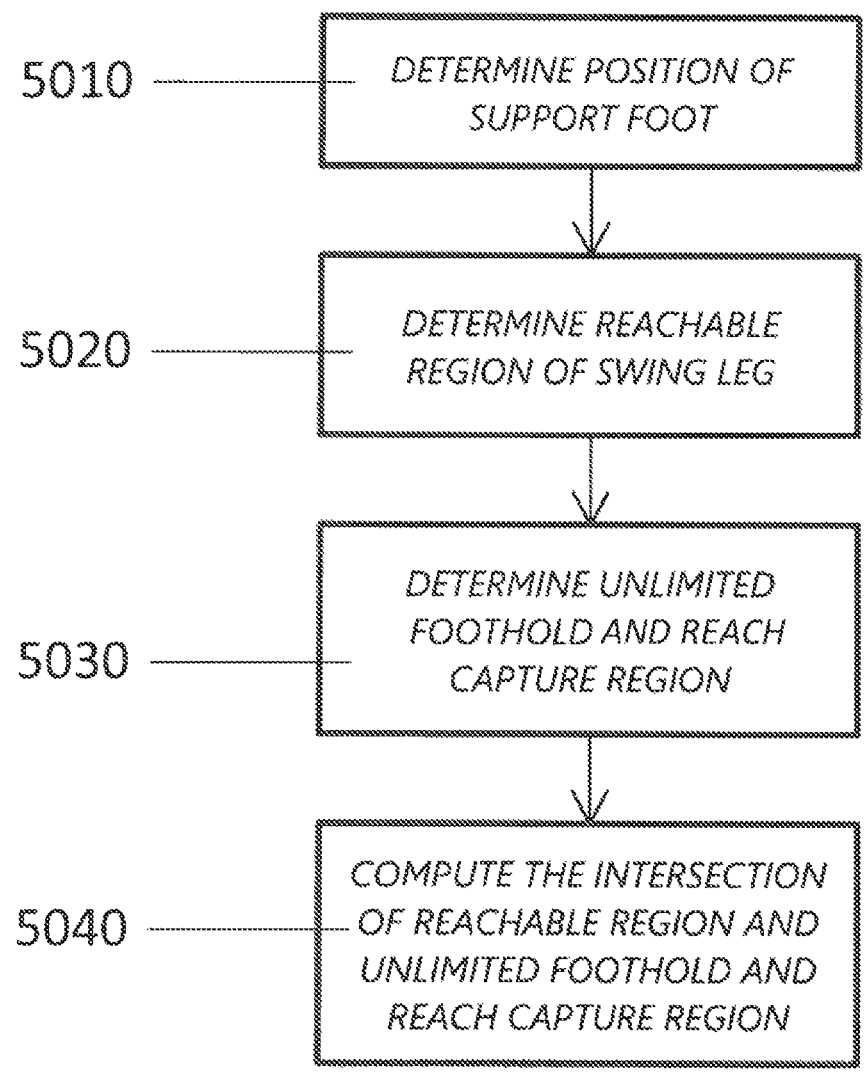
FIG. 15 is a flow chart showing the operation of the robot's control system.

Proceeding from left to right, the states described for right leg 106 are: loading response, early mid stance, late mid stance, terminal stance, pre swing, initial swing, mid swing, and terminal swing. FIGS. 14 and 15 schematically illustrate the control process carried out by the present invention. The reader should note that bipedal locomotion is a continuous process. Thus, the starting point used in the figures is not the only point at which the process could begin.

FIG. 14 describes the overall process of controlling the next step. In step 4010, the control system senses the current state of the robot. Next, the available foothold positions on the ground are determined (step 4020). This would be done by integrating sensor data in order to determine what regions in the desired direction of travel provide suitable footing. Next, the control system determines which leg should be swung (step 4030). In step 4040, a capture region is determined on the ground. Finally, the swing leg is controlled in order to swing the foot so that it lands within the capture region (step 4050).

Figure 16:
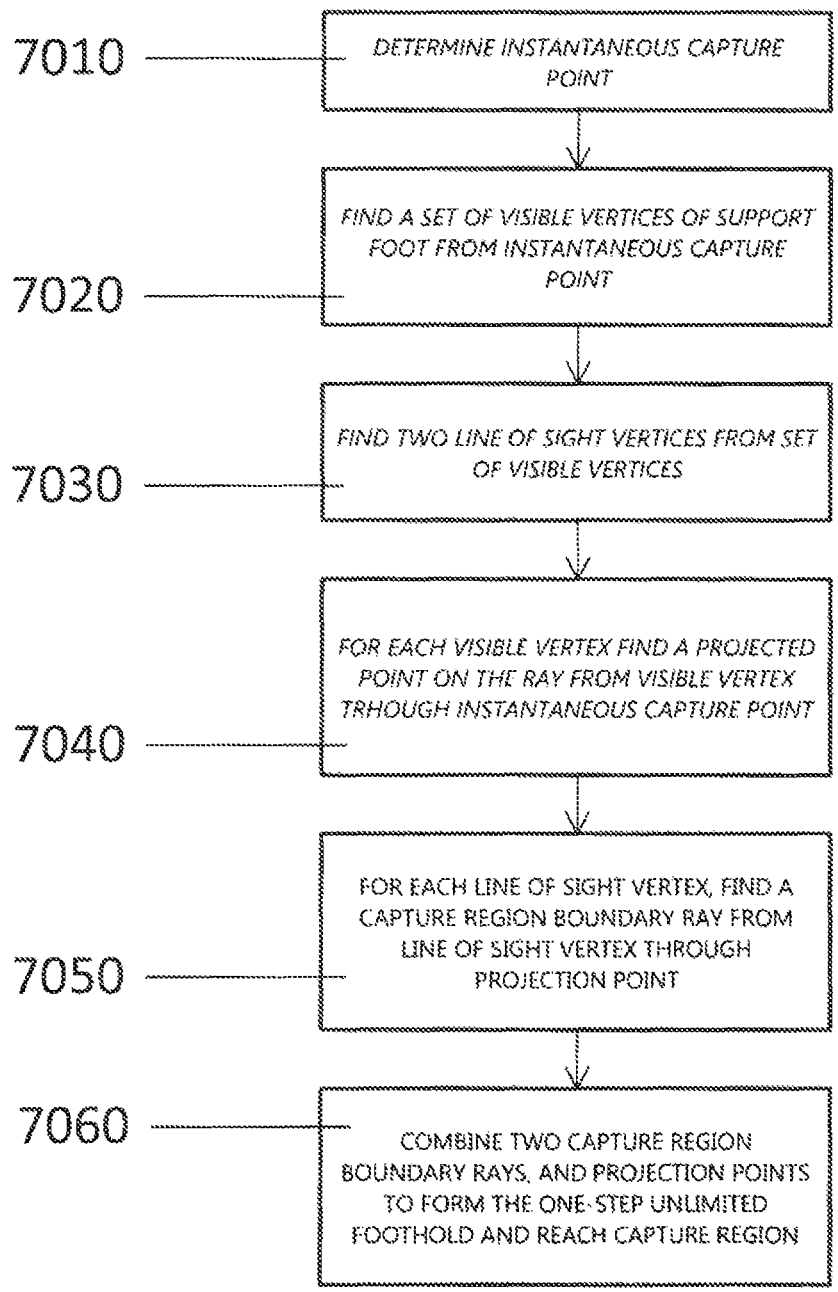
FIG. 16 is a flow chart showing the operation of the robot's control system.

FIG. 15 illustrates additional detail regarding the step of determining the capture region. In step 5010, the control system determines the position of the support foot. In step 5020, the system determines the reachable region for the swing leg (the area the swing leg is able to reach in a single step). In step 5030, the system determines the unlimited foothold and reach capture region. In step 5040, the system finds the intersection between the region found in step 5020 and the region found in step 5030. This then determines the region which (1) the swing leg can reach in a single step; (2) provides suitable footing; and (3) maintains 1-step capturability for the robot as a whole. FIG. 16 illustrates additional detail regarding the determination of the unlimited foothold and reach capture region. In step 7010, the position of the instantaneous capture point is determined. In step 7020, the set of visible vertices are found (such as visible vertices 410 in FIG. 11). Two line of sight vertices are then selected in step 7030 (such as points $q_0$ and $q_2$ in FIG. 11). A ray is then projected from each line of sight vertex through the instantaneous capture point (step 7040). This creates two diverging rays on the far side of the instantaneous capture point which limit the capture region (step 7050). Finally, the two capture region boundary rays and the projection points are intersected to form the unlimited foothold and reach capture region (step 7060).

Figure 17:
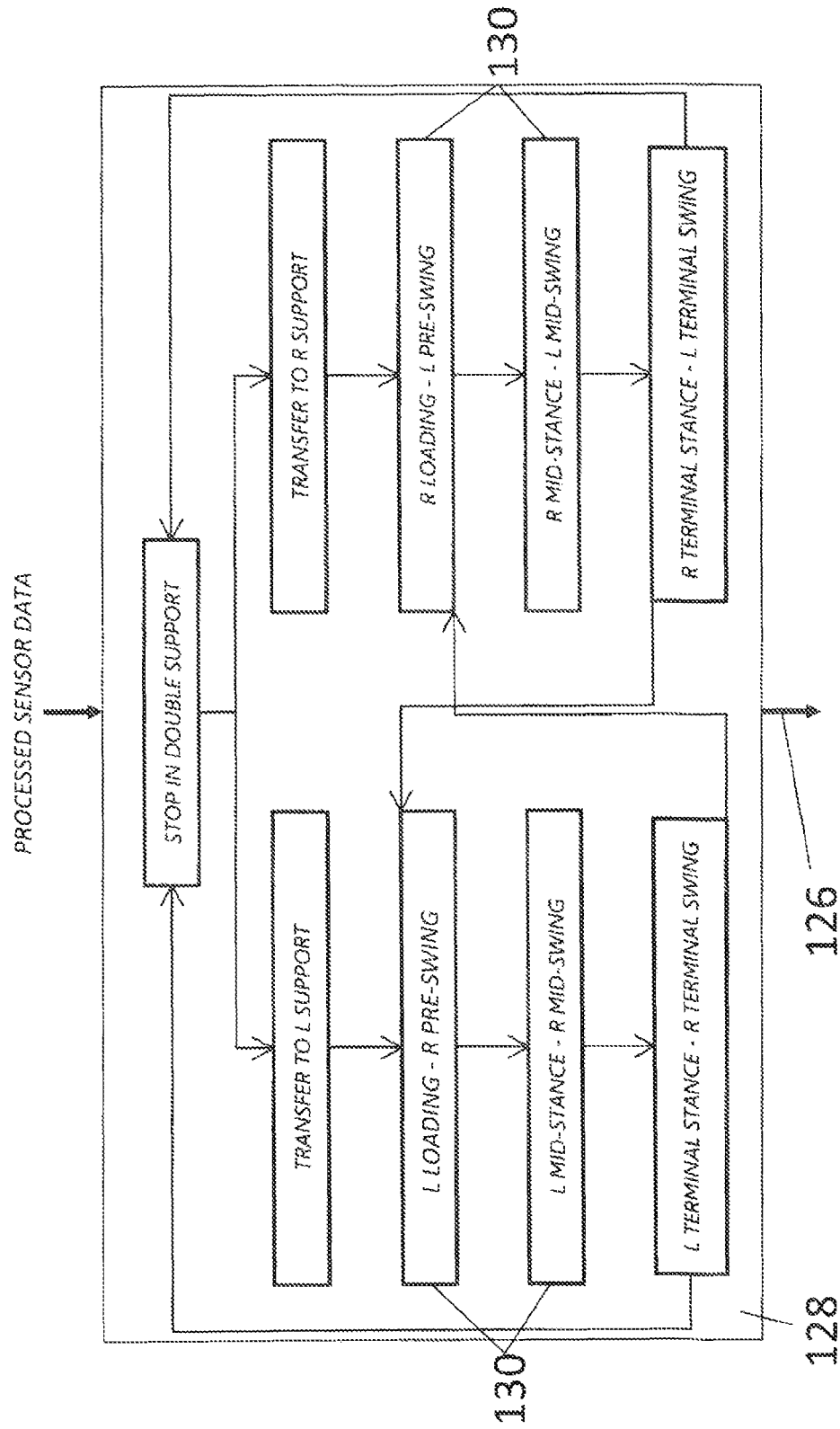
FIG. 17 is a flow chart showing the operation of the state generator.
Figure 18:
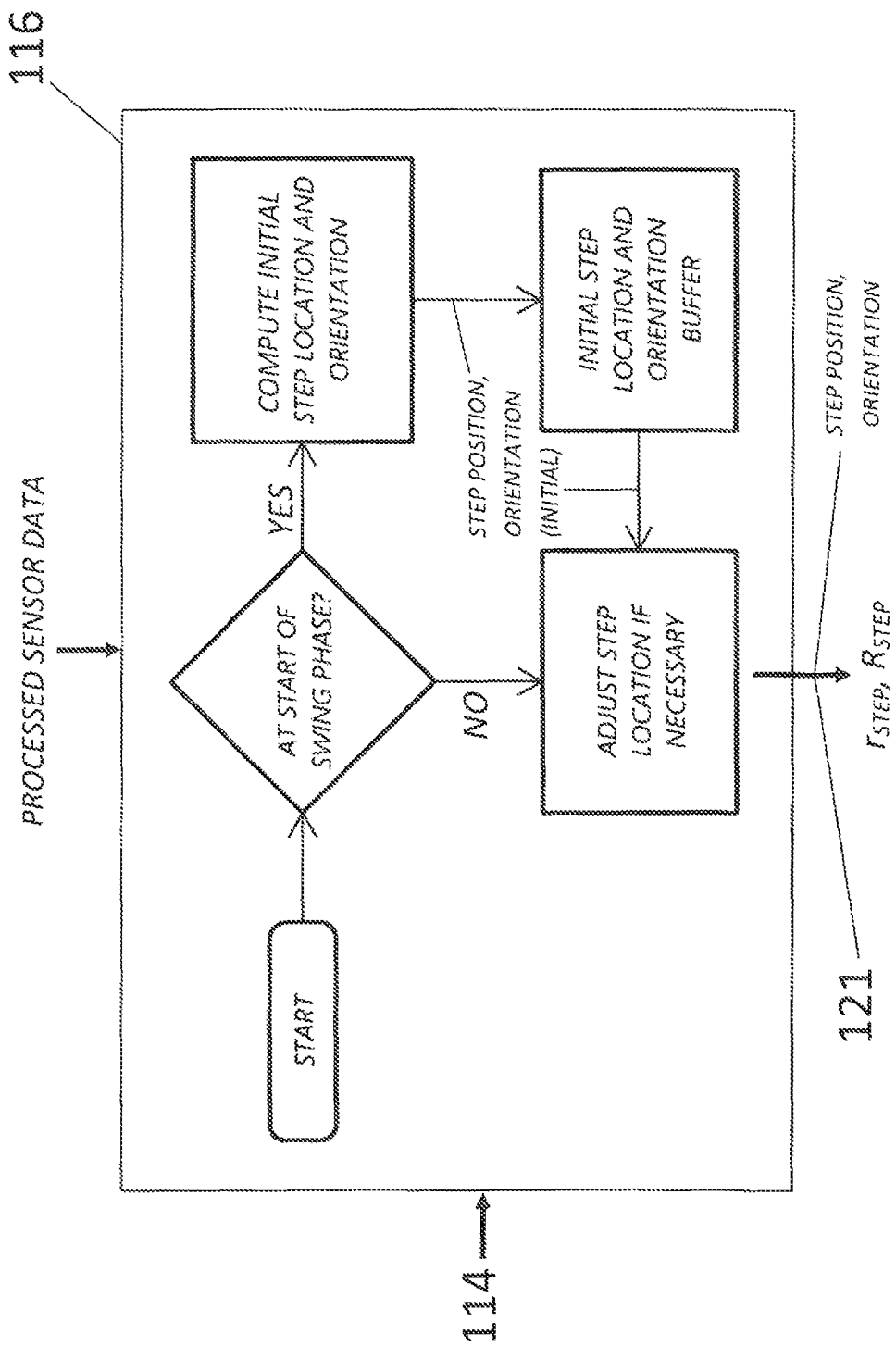
FIG. 18 is a flow chart showing the operation of the desired footstep calculator.

FIGS. 17-20 present flow charts depicting some of the operations of the inventive control system. FIG. 17 shows state generator 128. This subsystem provides information regarding the bipedal robot's current state. Processed sensor data is fed into this subsystem. The sensor data includes such things as joint angles, joint torques, body roll/pitch/yaw data, and body roll/pitch/yaw rate data. The bipedal robot is able to stop in a stance that is supported by both legs (shown at the top of the view). It is also able to remain balanced while walking.

When stopped in the double support mode, the robot can generally take a first step with either the left or the right leg. It then carries forward through the states 130 for the leg selected. At the end of the terminal stance for the leg in use, walking cycle transfer 460 occurs and the process repeats for the other leg. The subsystem remains in this cycling loop until it returns to the "stop in double support" mode. State generator 128 also provides state information 126 as an output. The state information is useful to other subsystems. As an example, the subsystem for controlling joint torques and positions need to know whether a particular leg is in a swing or stance state.

Figure 19:
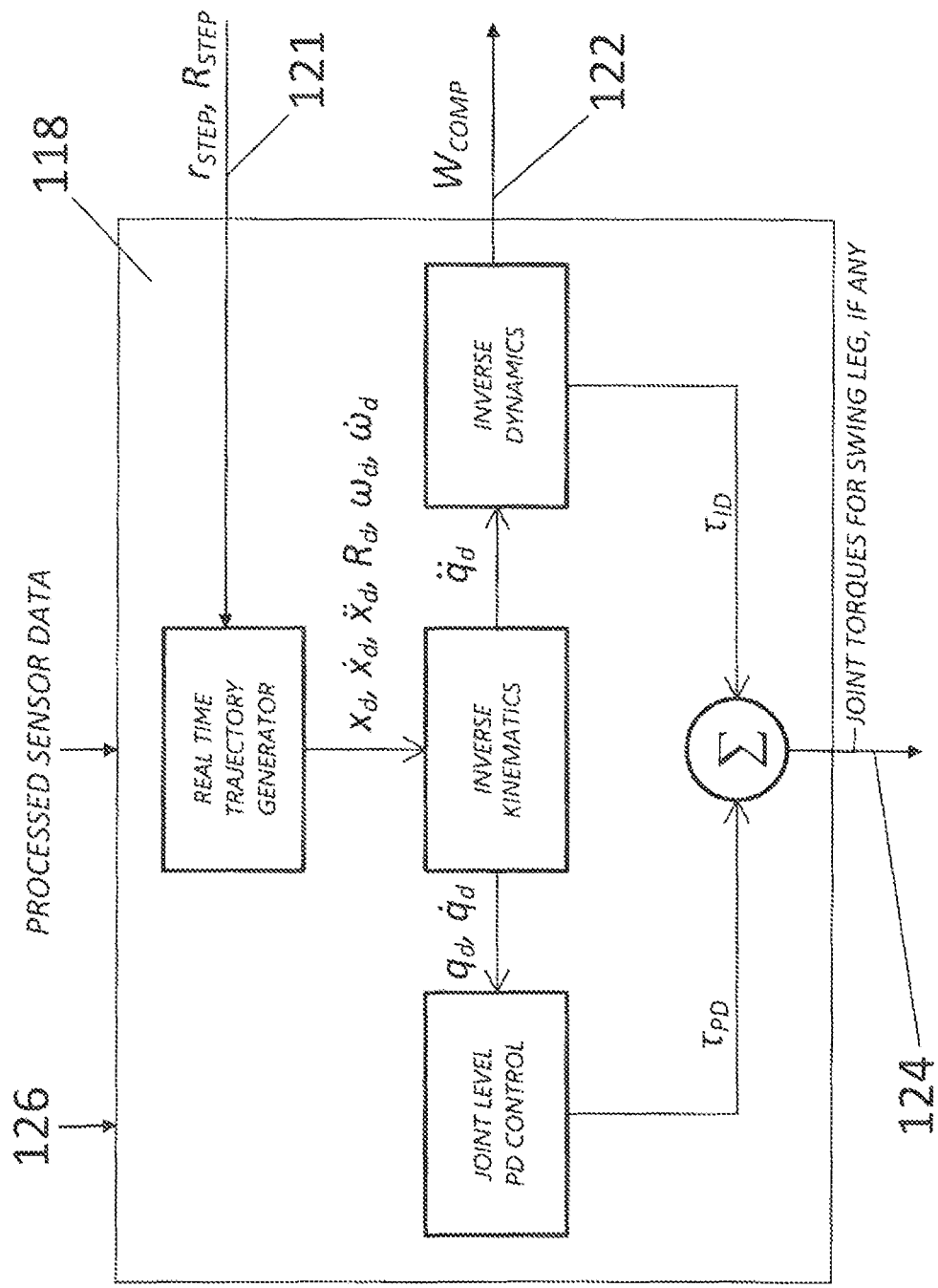
FIG. 19 is a flow chart showing the operation of the swing sub-controller.

FIG. 19 schematically depicts the operation of swing sub-controller 118. It receives processed sensor data, state information 129, and step information 121. A real time trajectory for the swinging leg is generated (which may be updated in mid-swing). The trajectory generator determines a desired position, velocity, acceleration, angular position, angular velocity, and angular acceleration for each of the segments of the multi-limbed system. This information is fed into an inverse kinematics module. The inverse kinematics module feed position and velocity information to a joint level proportional derivative ("PD") controller, which then outputs a desired torque for each joint.

The inverse kinematics module also feeds acceleration information to an inverse dynamics module. The inverse dynamics module produces a desired torque for each joint. These are summed with the output of the PD controller to create joint torque information 124. The inverse dynamics module also outputs upper body wrench information 122. A "wrench" is defined as a force and a torque. Joint torque information 124 drives the actuation of each of the powered joints. The application of these torques ultimately produce the desired motion of the bipedal robot.

Figure 20:
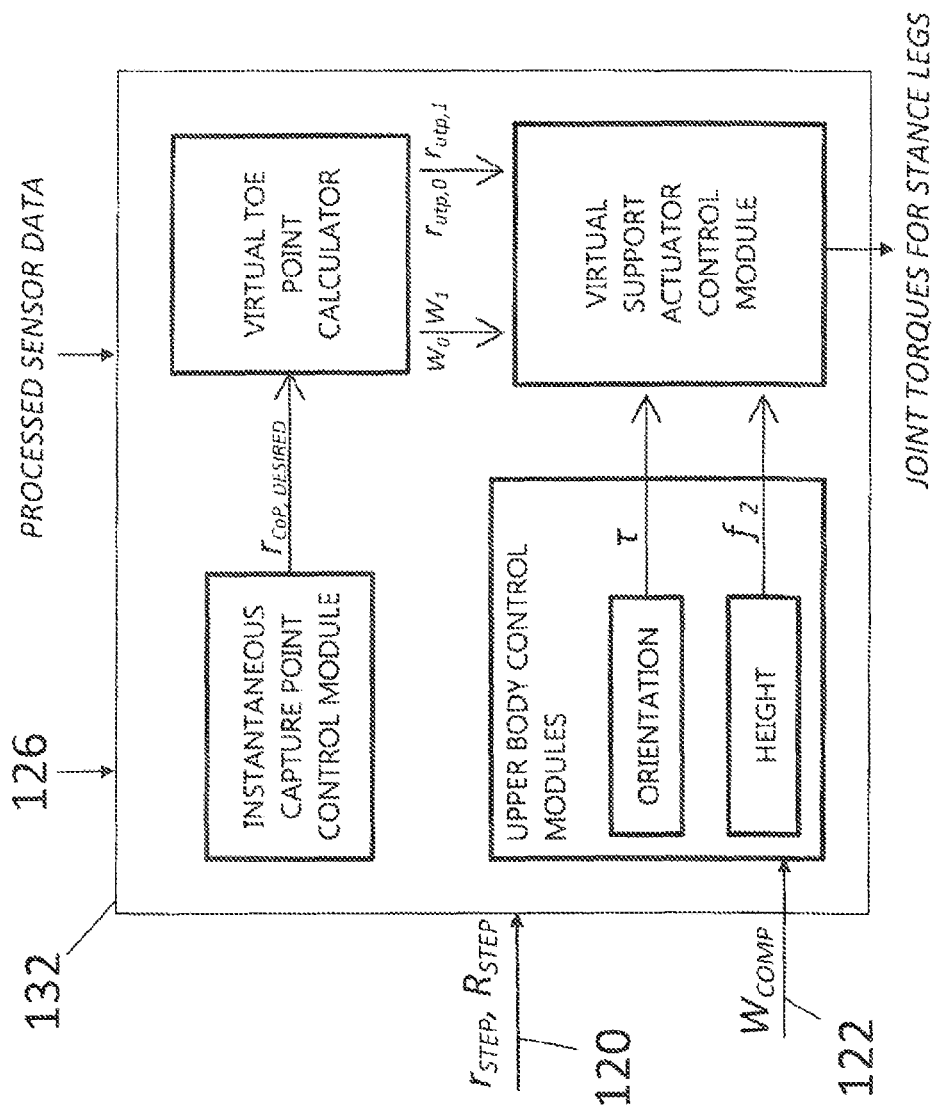
FIG. 20 is a flow chart showing the operation of the stance sub-controller.

FIG. 20 illustrates the operation of stance sub-controller 132. This subsystem controls the stance legs of the bipedal robot in order to prevent falling when standing or walking. The sub-controller receives processed sensor data, state information 126, step information 120, and upper body wrench information 122. The instantaneous capture point control module determines the location of the desired instantaneous capture point to a virtual toe point calculator (explained in more detail subsequently). The virtual toe point calculator determines the location of the virtual toe point at one or more times and sends this information to the virtual support actuator control module.

An upper body control module receives step information 120 and upper body wrench information 122. It then determines a desired height and orientation for the upper body. The height and orientation information is sent to the virtual support actuator control module. The virtual support actuator control module then outputs joint torques for the stance legs.

Goals of the stance sub-controller are to control (1) instantaneous capture point location, (2) upper body orientation, and (3) upper body height. All three components are important in reacting to a disturbance. It is often possible for a standing person who is pushed laterally to recover without moving the feet. This is largely accomplished by applying torques and forces between the stance legs and the upper body.

Figure 21:
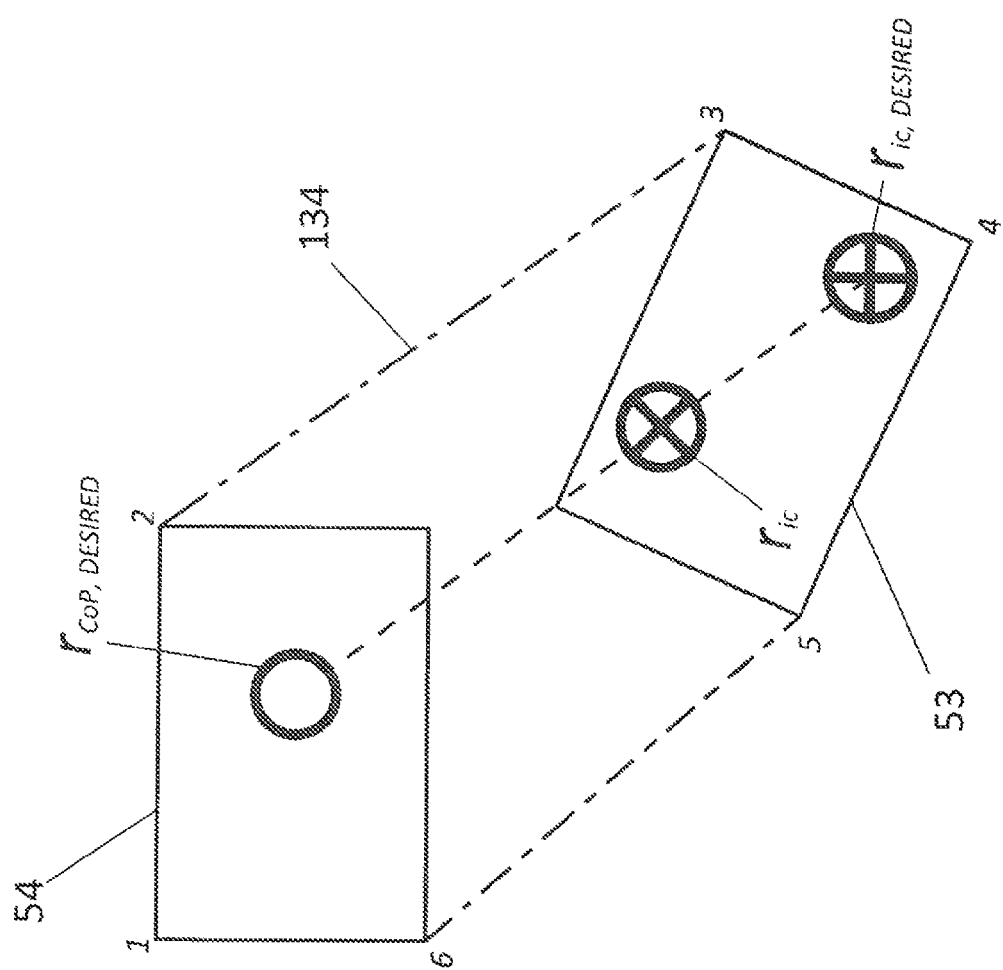
FIG. 21 is a plan view showing the case where the desired center of pressure is inside the support polygon of a bipedal robot.
Figure 22:
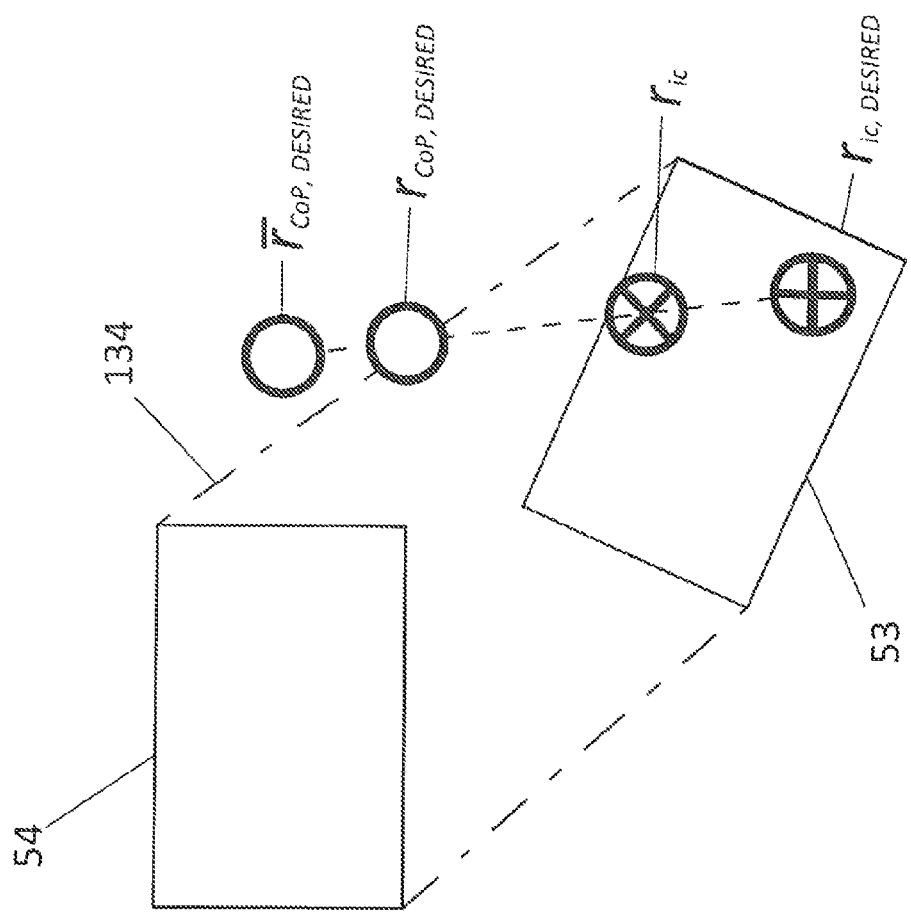
FIG. 22 is a plan view showing the case where the desired center of pressure is outside the support polygon of a bipedal robot.

FIGS. 21 and 22 depict the operation of the instantaneous capture point control module within the stance sub-controller during double support, while either walking or balancing during standing. In FIG. 21, left foot 54 and right foot 53 are in contact with the ground. The perimeter of the two rectangular feet and the lines connecting the vertices thereof define support polygon 134. The center of pressure ("CoP") remains within support polygon 134.

The output of the instantaneous capture point control module is the desired location of the CoP, which is denoted as $r_{CoP,desired}$.

In the case of FIG. 21, the instantaneous capture point is determined (labeled as $r_{ic}$). Next, a desired instantaneous capture point is determined ($r_{ic,\ desired}$). Given the knowledge of the current and desired location of the instantaneous capture point, a simple control law may be used to obtain the tentative location of the desired CoP:

$$\bar{r}_{CoP,desired} = r_{ic} + k_{ic}(r_{ic} - r_{ic,\ desired})$$

The term $k_{ic}$ is the proportional gain. This proportional control law is motivated by the linear instantaneous capture point dynamics for the 3D-LIP Model with finite-sized foot described previously. If $r_{CoP,\ desired}$ lies inside the support polygon, then the final output of the control module is $r_{CoP,desired} = \bar{r}_{CoP,desired}$ (the case shown in FIG. 21).

FIG. 22 shows the case where $\bar{r}_{CoP,desired}$ lies outside support polygon 134. In this case the position of $\bar{r}_{CoP,desired}$ is found by projecting $\bar{r}_{CoP,desired}$ to the edge of the support polygon along a line through $r_{ic}$ and $r_{ic,desired}$. The idea behind this control law is that the instantaneous capture point is always pushed away from the CoP (as time passes). Placing the CoP on the edge of the polygon as shown pushes the desired instantaneous capture point into the correct location.

In both FIG. 21 and FIG. 22 the instantaneous capture point was within the support polygon. Its location is determined as a function of the state and the control task. For the balancing task, the desired instantaneous capture point coincides with the centroid of the support polygon during the double-legged stance.

Balancing is also possible using only one leg. When this is commanded, the desired instantaneous capture point is moved to the centroid of the upcoming support foot, where it must remain as long as the robot is able to balance without taking a step.

For the transition to the walking task, the desired instantaneous capture point is located near the toes of the leading foot (promoting forward motion). At the start of the swing phase, the desired instantaneous capture point is moved forward of the stance foot in the direction of the upcoming step location.

Figure 23:
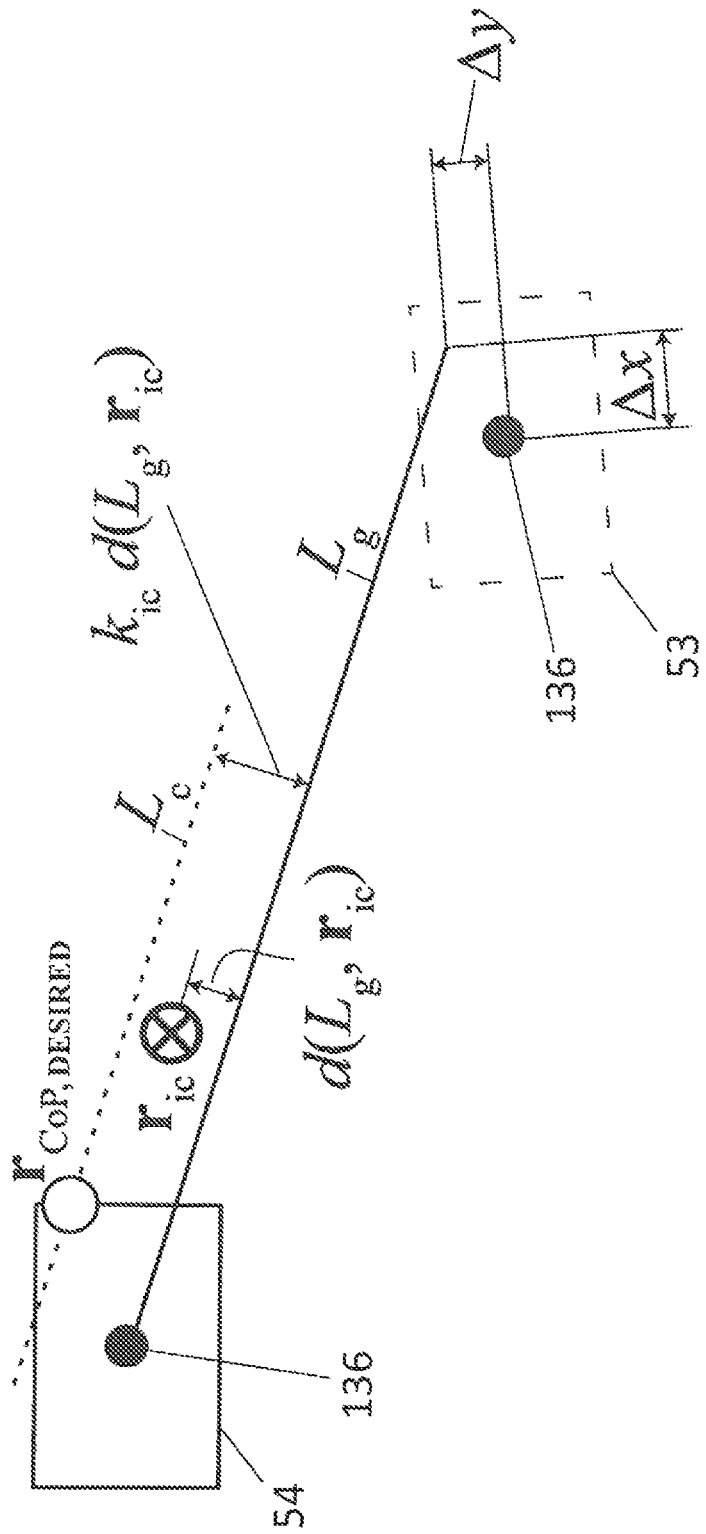
FIG. 23 is a plan view, showing the determination of a desired center of pressure during motion toward the next planned step location.

FIG. 23 shows a situation where the instantaneous capture point lies outside the support polygon during single support. This situation generally requires the robot to take a step in order to maintain balance. It occurs either because the robot has been pushed significantly or because the control system has deliberately driven the instantaneous capture point forward of the support polygon during the walking task. When the instantaneous capture point ($r_{ic}$) is outside the support polygon it is not possible to track a desired instantaneous capture point location, since the instantaneous capture point will always exponentially diverge away from the stance foot. The control system is therefore limited to controlling the direction of motion for the instantaneous capture point.

Control is exerted by specifying a guide line ($l_g$ in FIG. 23) and choosing the desired CoP such that the instantaneous capture point is kept along this guide line. The guide line itself is created using two reference points. The first is contact reference point 136 on the support foot (in this case left foot 54). The second point is $\Delta x$ in front of and $\Delta y$ to the inside of the contact reference point 136 for the planned step (in this case made by right foot 53).

The contact reference point for the planned footstep may be calculated using the following expressions:

$$\Delta x = k_{xx} v_{desired,x}$$

$$\Delta y = k_{xy} |v_{desired,x}|$$

The two gains are constant gains and the velocity $v_{desired,x}$ is the desired average velocity of the robot in the forward direction, in a frame oriented to match the planned step location. The effect of this simple control law is that the instantaneous capture point is pushed forward and to the inside of the upcoming support foot as desired forward velocity is increased.

Given the knowledge of the location of the guide line and the instantaneous capture point location, a second line called a control line ($L_c$) can be determined. The distance between the guide line and the control line is set to be proportional to the distance between the guide line and the instantaneous capture point. This distance may be expressed as:

$$d(L_g, L_c) = k_{ic} d(L_g, r_{ic})$$

The constant $k_{ic}$ is a positive gain.

After establishing the control line, the desired CoP is located by finding the intersection of the stance foot polygon (left foot 54 in FIG. 23) and the control line (The intersection that is closest to $r_{ic}$ is used). In the event there is no intersection, then the support polygon vertex that is closest to the control line is used for the CoP. This simple control law causes the instantaneous capture point to be pushed back on the guide line after a deviation (such as one produced by a lateral disturbance).

The present inventive method may also include the use of a virtual toe point calculator. This subsystem uses the desired CoP to compute a virtual toe point (VTP) and leg support fraction for each leg. The leg support fraction is the fraction of the total robot weight that is supported by each leg in a stance configuration. Controlling VTP locations and leg support fractions results in approximate control of the overall CoP of the robot.

The VTP of a particular foot is the point about which no torque is commanded in the horizontal plane (no pitch and roll). VTP's are similar to the centers of pressure for each foot, except that a VTP is a commanded quantity, not a measured one, and is only based on static analysis.

Figure 24:
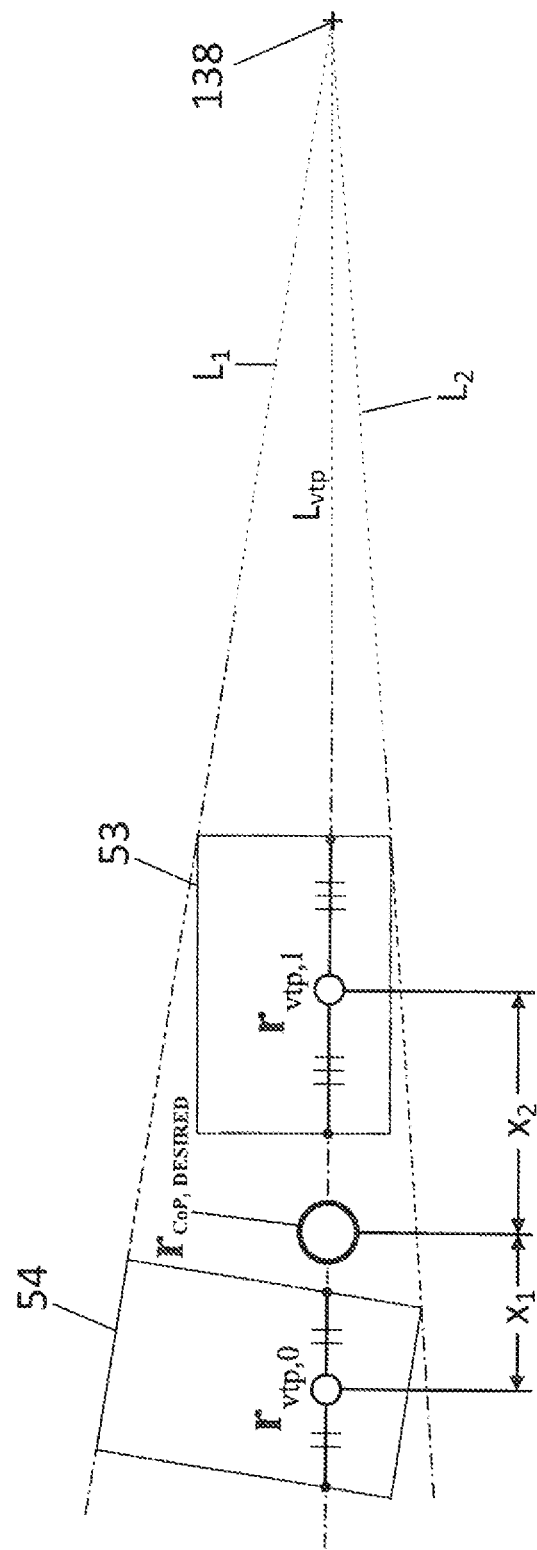
FIG. 24 is a plan view, showing the location of a desired center of pressure during a two-legged stance.

If a robot is balancing on one foot, the VTP for the stance led is placed at the location of the desired CoP. FIG. 24 shows the more complex scenario of support using both legs. A heuristic expression based on geometric relations is used in such a way that the desired CoP and both VTP's lie on the same line.

The leg support fractions are two scalars, denoted as $w_0$ and $w_1$, which satisfy the expression $w_0 + w_1 = 1$ and $w_0, w_1 \in \{0,1\}$. The distances between the VTP's and the overall desired CoP determine the leg support fractions, which may be expressed as:

$$w_i = \frac{\|r_{CoP,des} - r_{vtp,1-i}\|}{\|r_{vtp,0} - r_{vtp,1}\|}, i \in \{0, 1\}$$

This equation is derived from the moment balance around the desired CoP. If a VTP is far removed from the desired CoP, then a force exerted at that VTP will have a large moment arm and hence the associated leg support fraction will be small. Support is gradually transferred from one leg to the other in double support due to continuously changing leg support fractions associated with a continuous desired CoP trajectory.

A description of the graphical presentation found in FIG. 24 will aid the reader's understanding of these concepts. The lines $L_1$ and $L_2$ are extensions of the edges of the support polygon created by the placement of left foot 54 and right foot 53. These two lines converge to create intersection 139. The line $L_{vtp}$ is then created by creating a line from intersection 138 that passes through the desired CoP. The VTP for each foot is required to lie along this line and is placed in the center of the portion of the line passing through the foot polygon.

The leg support fractions may then be determined based on the distance between each VTP and the CoP. For the case where the desired CoP lies outside the two VTP's, then the VTP for the nearest foot is chosen to be equal to the desired CoP and that leg is assigned a support fraction of 1.

The virtual support actuator control module described in FIG. 20 will now be explained in some detail. The virtual support actuator control module distributes the torque $\tau$ and the vertical force $f_z$ over the support leg(s) using the support fractions $w_i$ as weighting factors. This may be expressed as follows:

$$f_{z,i} = w_i f_z i \in \{0, 1\}$$

$$\tau_i = w_i \tau$$

The components $f_{z,i}$ and $\tau_i$ are the z-component of the force and torque to be expected by a particular leg. The partial wrenches (a wrench being a combined force and torque) are used to compute a desired wrench $W_i$ for each leg, where $$W_i (f_i^T \tau_i^T)^T \text{ with}$$

$$f_i = (f_{x,i}, f_{y,i}, f_{z,i})^T \text{ and}$$

$$\tau_i = (\tau_{x,i}, \tau_{y,i}, \tau_{z,i})^T.$$

The remaining x and y components of the force $f_i$ are computed for each leg using the virtual toe points. The virtual toe point constraint regarding the absence of torque in the horizontal plane may be enforced as follows: The VTP for a foot is considered to be the intersection of the axes of two pin joints, located on the sole of the foot. These two perpendicular axes of rotation lie in the plane of the foot. It is important to realize that the virtual pin joints do not actually exist on the physical robot, but rather provide a convenient way of computing the forces in the x and y directions (since the torques across these joints should be zero). Creating this point of reference allows for the solution of the values of $f_{x,i}$ and $f_{y,i}$. Once these values are known, one can compute the complete wrench to be exerted on the upper body by a particular stance leg. This then allows the computation of the actual joint torques for each actual joint in each leg.

Computing the values for $f_{x,i}$ and $f_{y,i}$ based on VTP's instead of specifying these forces directly has an advantage in that the VTP's are closely related to the CoP (see FIG. 24) which plays a major role in the instantaneous capture point dynamics. This relation to the CoP also means that limits due to the finite-sized support polygon are relatively easy to deal with. The inventive method simply makes sure that each foot's VTP lies inside its convex polygon.

The inventive methods thus described performed quite well in controlling the standing and walking motions of a bipedal humanoid robot. The evaluations included walking over a set of available "stepping stones" where the control system was forced to carefully evaluate a suitable location for the next step. For both balancing and walking, the system evaluates the area of the N-step capture region. The preferred embodiment uses the N=1 area.

The inventive system is able to achieve balance on one leg, including recovery from sideways and forward pushes. In testing, the control system was able to recover from a disturbing "push" as large as 21 Newton seconds (about 5 pound seconds). The system was also able to control a robot in walking locomotion despite the introduction of lateral pushes.

Figure 25:
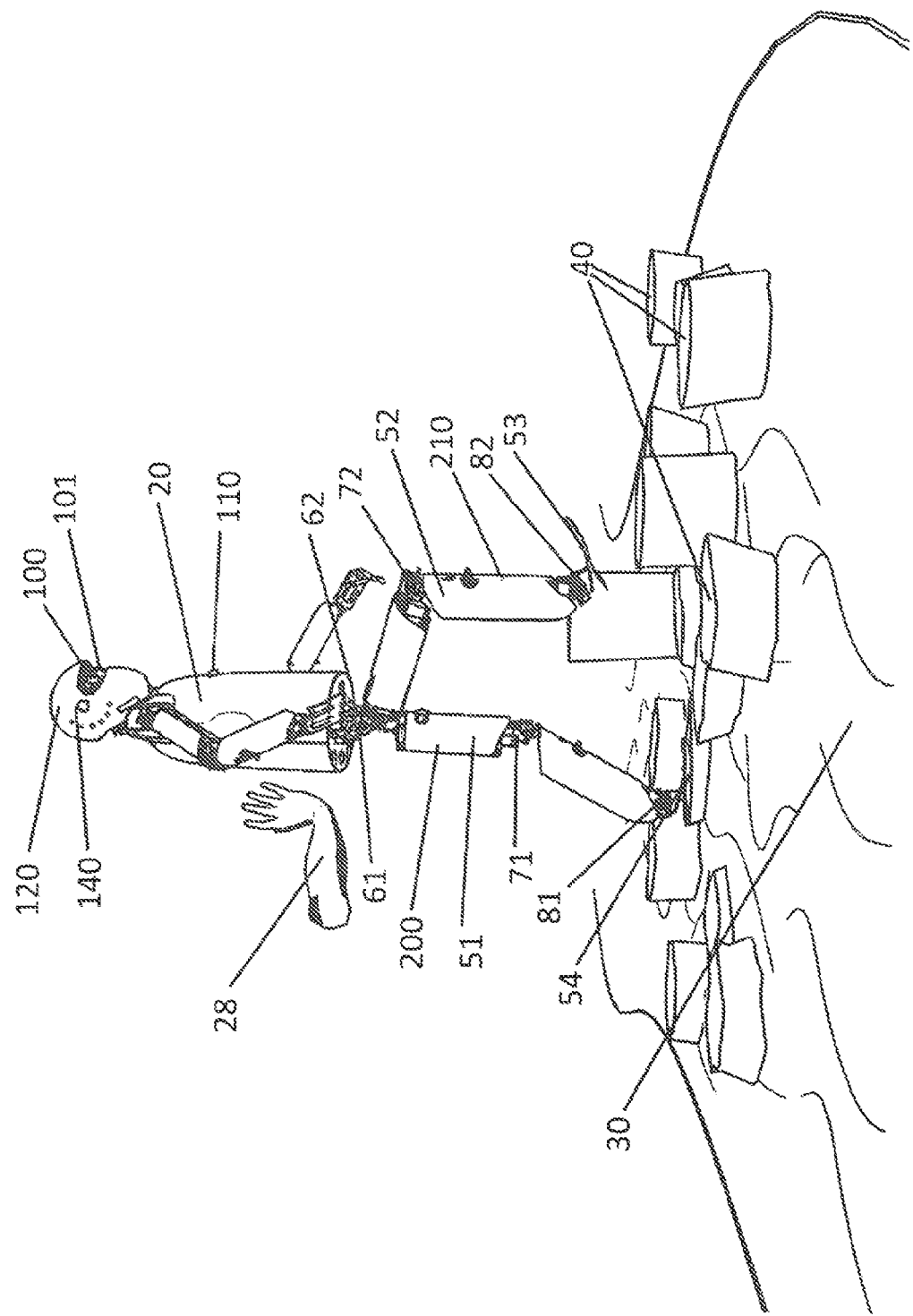
FIG. 25 is a perspective view, showing a bipedal robot walking over an array of stepping stones.
Figure 26:
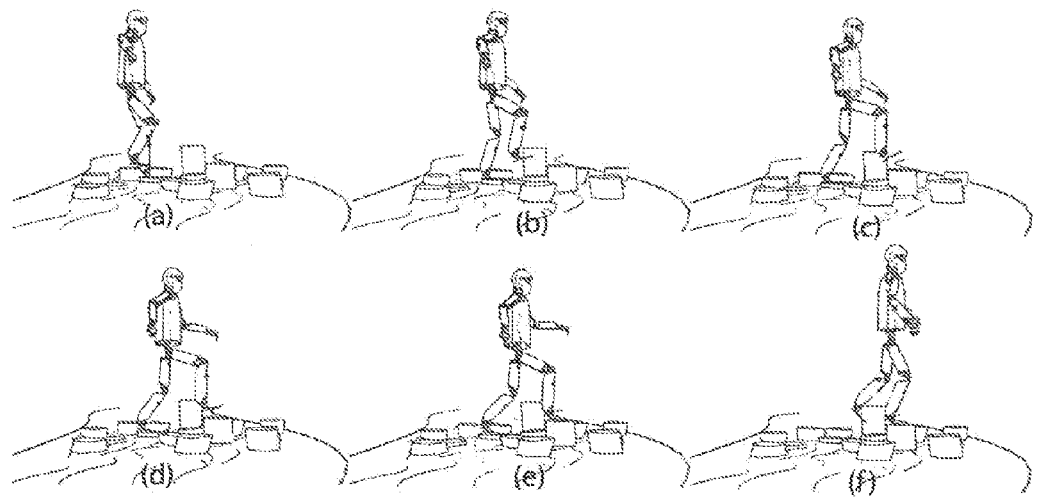
FIG. 26 is a perspective view, showing a bipedal robot walking over an array of stepping stones.
Figure 27:
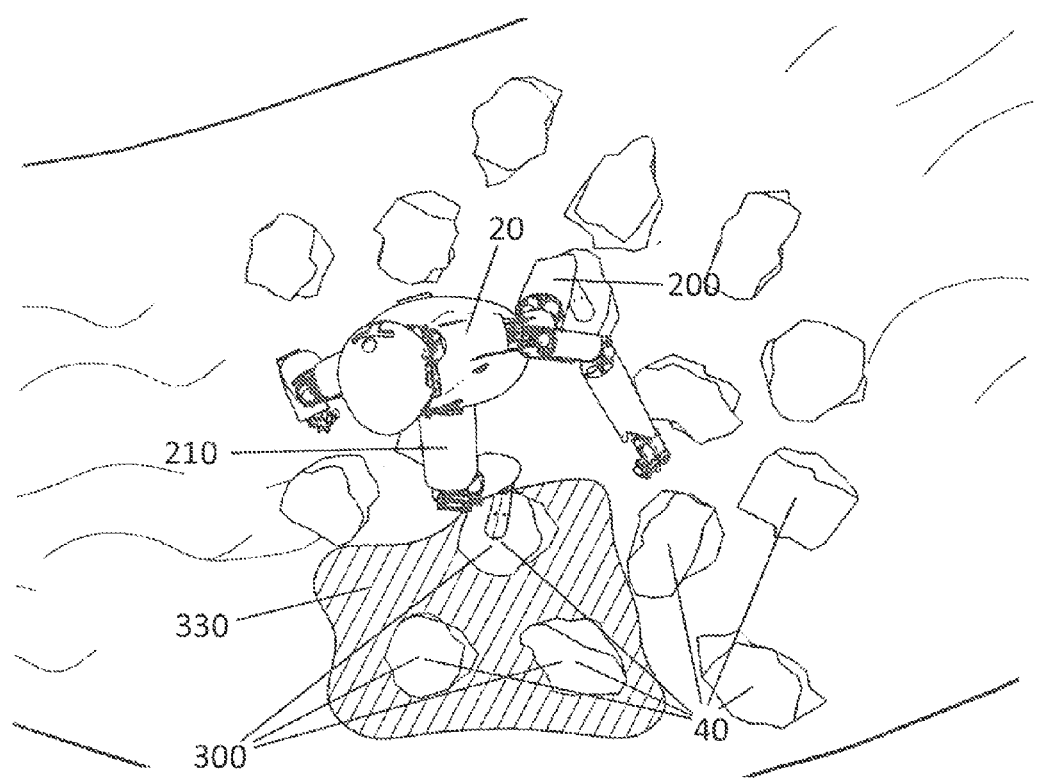
FIG. 27 is a perspective view, showing a bipedal robot walking over an array of stepping stones.

FIGS. 25-27 illustrate a bipedal humanoid robot operating under the direction of the present inventive control system. In FIG. 25, humanoid robot 20 is performing the tasks needed to successfully cross stream 30. An array of stepping stones 40 present possible step locations while the stream itself obviously presents large areas to avoid. The robot is equipped with various sensors. In this embodiment, two camera systems 101, 101 provide binocular vision. Inertial measurement unit 120 provides orientation and rate information. Laser rangefinder 110 provides accurate distance information.

Stance leg 200 is planted and left foot 54 carries the robot's weight. Swing leg 210 is swinging forward to place right foot 53 in a preferred location. Disturbance 28 (in this example a lateral shove) may be applied to the moving robot.

FIG. 26 shows the progress of the bipedal robot across the array of stepping stones. As the robot progresses from FIGS. 26(a) to 26(f), the reader will note how it is able to accommodate the highly uneven walking surface.

FIG. 27 shows the robot from above. Stance leg 200 is planted while swing leg 210 is descending in a forward direction. Unlimited foothold capture region 330 is determined. The system next determines which of the stepping stones 40 lie within this region. These stones then become capture regions 300. Using the concepts of 1-step capturability explained previously, the robot is able to move from stone to stone and successfully cross the obstacle.

The preceding description contains significant detail regarding the novel aspects of the present invention. It is should not be construed, however, as limiting the scope of the invention but rather as providing illustrations of the preferred embodiments of the invention. Thus, the scope of the invention should be fixed by the claims presented, rather than by the examples given.

Having described our invention, we claim:

1. A method for controlling the motion of a bipedal humanoid robot having a center of mass, a first leg and a second leg, said first leg ending in a first support foot bounded by a first support polygon, and said second leg ending in a second support foot bounded by a second support polygon, comprising:
   a. providing said robot with sensors configured to determine orientation information for said humanoid robot and rate of orientation change for said humanoid robot;
   b. providing a control system for said robot, with said control system receiving said orientation and said orientation rate information from said sensors;
   c. said control system using said orientation information and said rate of orientation change information to determine a position of said center of mass and a velocity of said center of mass;
   d. said control system determining an instantaneous capture point of said humanoid robot based on said position of said center of mass, and said velocity of said center of mass;
   e. said control system using said orientation information to determine a set of vertices for said first polygon that are visible from said instantaneous capture point;
   f. said control system defining a set of reflected visible vertices by reflecting each of said visible vertices through said instantaneous capture point;
   g. said control system using said instantaneous capture point and said set of reflected visible vertices to define first and second capture region boundary rays;
   h. said control system determining a maximum step boundary;
   i. said control system defining a capture region bounded by said set of reflected visible vertices, said first capture region boundary ray, said second capture region boundary ray, and said maximum step boundary; and
   j. said control system controlling the motion of said second leg to place at least a portion of said second support polygon into said capture region.

2. A method for controlling the motion of a bipedal humanoid robot as recited in claim 1, further comprising:
   a. providing an external sensor on said robot configured to provide data defining an environment surrounding said robot;
   b. said control system using said data defining said surrounding environment to determine a set of polygons which provide appropriate footing for said humanoid robot;
   c. said control system intersecting said set of polygons which provide appropriate footing with said capture region to form a second set of polygons that lie within said capture region and that provide appropriate footing; and
   d. said control system controlling the motion of said second leg to place at least a portion of said second support foot region into said second set of polygons.

3. A method for controlling the motion of a bipedal humanoid robot as recited in claim 1, wherein:
   a. said first support foot is connected to said first leg by a first pivoting ankle joint; and
   b. said second support foot is connected to said second leg by a second pivoting ankle joint.

4. A method for controlling the motion of a bipedal humanoid robot as recited in claim 3, wherein said control system expands said capture region to account for the fact said second support foot can pivot with respect to said second leg.

5. A method for controlling the motion of a bipedal humanoid robot as recited in claim 2, wherein:
   a. said first support foot is connected to said first leg by a first pivoting ankle joint; and
   b. said second support foot is connected to said second leg by a second pivoting ankle joint.

6. A method for controlling the motion of a bipedal humanoid robot as recited in claim 5, wherein said control system expands said capture region to account for the fact said second support foot can pivot with respect to said second leg.

7. A method for controlling the motion of a bipedal humanoid robot as recited in claim 1 wherein:
   a. said bipedal robot receives a disturbing force while swinging said second support polygon toward said capture region;
   b. after receiving said disturbing force, said control system recalculates said instantaneous capture point and said capture region to determine a revised instantaneous capture point and a revised capture region; and
   c. said control system controlling the motion of said second leg to place at least a portion of said second support polygon into said revised capture region.

8. A method for controlling the motion of a bipedal humanoid robot as recited in claim 2 wherein:
   a. said bipedal robot receives a disturbing force while swinging said second support polygon toward said second set of polygons;
   b. after receiving said disturbing force, said control system recalculates said instantaneous capture point and said capture region to determine a revised instantaneous capture point and a revised capture region;
   c. said control system intersecting said set of polygons which provide appropriate footing with said revised capture region to form a revised second set of polygons that lie within said revised capture region and that provide appropriate footing; and
   d. said control system controlling the motion of said second leg to place at least a portion of said second support foot region into said revised second set of polygons.

9. A method for controlling the motion of a bipedal humanoid robot as recited in claim 8, wherein:
   a. said first support foot is connected to said first leg by a first pivoting ankle joint; and
   b. said second support foot is connected to said second leg by a second pivoting ankle joint.

10. A method for controlling the motion of a bipedal humanoid robot as recited in claim 3 wherein:
   a. said bipedal robot receives a disturbing force while swinging said second support polygon toward said capture region;
   b. after receiving said disturbing force, said control system recalculates said instantaneous capture point and said capture region to determine a revised instantaneous capture point and a revised capture region; and
   c. said control system controlling the motion of said second leg to place at least a portion of said second support polygon into said revised capture region.

* * * * *